(12) United States Patent
Bonnet et al.

(10) Patent No.: US 8,738,360 B2
(45) Date of Patent: May 27, 2014

(54) DATA DETECTION OF A CHARACTER SEQUENCE HAVING MULTIPLE POSSIBLE DATA TYPES

(75) Inventors: Olivier Bonnet, Paris (FR); Frederic de Jaeger, Paris (FR); Romain Goyet, Paris (FR)

(73) Assignee: Apple Inc., Cupertino, CA (US)

( * ) Notice: Subject to any disclaimer, the term of this patent is extended or adjusted under 35 U.S.C. 154(b) by 1154 days.

(21) Appl. No.: 12/240,625

(22) Filed: Sep. 29, 2008

(65) Prior Publication Data

US 2009/0306964 A1    Dec. 10, 2009

Related U.S. Application Data

(60) Provisional application No. 61/059,720, filed on Jun. 6, 2008.

(51) Int. Cl.
*G06F 17/21* (2006.01)
*G06F 17/27* (2006.01)

(52) U.S. Cl.
USPC ...... 704/9; 704/1; 704/10; 707/755; 717/143; 717/144

(58) Field of Classification Search
USPC .................. 704/9–10; 707/755; 717/143–144
See application file for complete search history.

(56) References Cited

U.S. PATENT DOCUMENTS

| | | |
|---|---|---|
| 4,227,245 A | 10/1980 | Edblad et al. |
| 4,791,556 A | 12/1988 | Vilkaitis |
| 4,818,131 A | 4/1989 | Sakai |
| 4,873,662 A | 10/1989 | Sargent |
| 4,907,285 A | 3/1990 | Nakano et al. |
| 4,965,763 A | 10/1990 | Zamora |
| 5,034,916 A | 7/1991 | Ordish |
| 5,146,406 A | 9/1992 | Jensen |
| 5,155,806 A | 10/1992 | Hoeber et al. |
| 5,157,736 A | 10/1992 | Boyer et al. |
| 5,182,709 A | 1/1993 | Makus |
| 5,189,632 A | 2/1993 | Paajanen et al. |
| 5,283,856 A | 2/1994 | Gross et al. |
| 5,299,261 A | 3/1994 | Bogart et al. |
| 5,301,350 A | 4/1994 | Rogan et al. |

(Continued)

FOREIGN PATENT DOCUMENTS

| | | |
|---|---|---|
| EP | 0 458 563 A2 | 11/1991 |
| EP | 0 458 563 B1 | 11/1991 |

(Continued)

OTHER PUBLICATIONS van den Brand et al. "Generalized Parsing and Term Rewriting Semantics Directed Disambiguation" 2003.*

(Continued)

*Primary Examiner* — Douglas Godbold
(74) *Attorney, Agent, or Firm* — Blakely, Sokoloff, Taylor & Zafman LLP

(57) ABSTRACT

A method of processing a sequence of characters, the method comprising converting the sequence of characters into a sequence of tokens so that each token comprises a lexeme and one of a plurality of token types. Each of the plurality of token types relates to at least one of a plurality of predetermined functions, wherein at least one said token type relates to multiple functions of the plurality of predetermined functions.

16 Claims, 7 Drawing Sheets

(56) References Cited

U.S. PATENT DOCUMENTS

| | | | |
|---|---|---|---|
| 5,317,509 A * | 5/1994 | Caldwell | 704/9 |
| 5,346,516 A | 9/1994 | Alkhas et al. | |
| 5,369,778 A | 11/1994 | San Soucie et al. | |
| 5,375,200 A | 12/1994 | Dugan et al. | |
| 5,390,281 A | 2/1995 | Luciw et al. | |
| 5,398,336 A | 3/1995 | Tantry et al. | |
| 5,418,717 A | 5/1995 | Su et al. | |
| 5,424,947 A | 6/1995 | Nagao et al. | |
| 5,434,777 A | 7/1995 | Luciw | |
| 5,437,036 A | 7/1995 | Stamps et al. | |
| 5,442,742 A | 8/1995 | Greyson et al. | |
| 5,463,772 A | 10/1995 | Thompson et al. | |
| 5,477,447 A | 12/1995 | Luciw et al. | |
| 5,483,352 A | 1/1996 | Fukuyama et al. | |
| 5,572,643 A | 11/1996 | Judson | |
| 5,583,921 A | 12/1996 | Hidaka | |
| 5,604,897 A | 2/1997 | Travis | |
| 5,608,624 A | 3/1997 | Luciw | |
| 5,610,812 A | 3/1997 | Schabes et al. | |
| 5,621,658 A | 4/1997 | Jackson et al. | |
| 5,621,903 A | 4/1997 | Luciw et al. | |
| 5,627,948 A | 5/1997 | Fukunaga | |
| 5,634,124 A | 5/1997 | Khoyi et al. | |
| 5,642,435 A | 6/1997 | Loris | |
| 5,644,735 A | 7/1997 | Luciw et al. | |
| 5,649,222 A | 7/1997 | Mogilevsky | |
| 5,666,552 A | 9/1997 | Greyson et al. | |
| 5,687,333 A | 11/1997 | Dobashi et al. | |
| 5,692,032 A | 11/1997 | Seppanen et al. | |
| 5,708,845 A | 1/1998 | Wistendahl et al. | |
| 5,721,939 A * | 2/1998 | Kaplan | 704/9 |
| 5,732,229 A | 3/1998 | Dickinson | |
| 5,737,734 A | 4/1998 | Schultz | |
| 5,787,432 A | 7/1998 | Le Tourneau | |
| 5,790,875 A | 8/1998 | Andersin et al. | |
| 5,794,142 A | 8/1998 | Vanttila et al. | |
| 5,799,268 A | 8/1998 | Boguraev | |
| 5,806,032 A * | 9/1998 | Sproat | 704/255 |
| 5,815,138 A | 9/1998 | Tsubaki et al. | |
| 5,815,142 A | 9/1998 | Allard et al. | |
| 5,838,458 A | 11/1998 | Tsai | |
| 5,838,906 A | 11/1998 | Doyle et al. | |
| 5,859,636 A | 1/1999 | Pandit | |
| 5,862,395 A | 1/1999 | Bier | |
| 5,864,789 A | 1/1999 | Lieberman et al. | |
| 5,890,103 A * | 3/1999 | Carus | 704/9 |
| 5,900,005 A | 5/1999 | Saito | |
| 5,906,656 A | 5/1999 | Keller et al. | |
| 5,946,629 A | 8/1999 | Sawyer et al. | |
| 5,946,647 A | 8/1999 | Miller et al. | |
| 5,966,652 A | 10/1999 | Coad et al. | |
| 5,987,029 A | 11/1999 | Kotani et al. | |
| 5,995,106 A | 11/1999 | Naughton et al. | |
| 6,026,233 A | 2/2000 | Shulman et al. | |
| 6,034,689 A | 3/2000 | White et al. | |
| 6,044,250 A | 3/2000 | Kuramatsu et al. | |
| 6,049,796 A | 4/2000 | Siitonen et al. | |
| 6,115,710 A | 9/2000 | White | |
| 6,125,281 A | 9/2000 | Wells et al. | |
| 6,212,494 B1 | 4/2001 | Boguraev | |
| 6,222,549 B1 * | 4/2001 | Hoddie | 345/419 |
| 6,243,669 B1 * | 6/2001 | Horiguchi et al. | 704/9 |
| 6,249,283 B1 | 6/2001 | Ur | |
| 6,262,735 B1 | 7/2001 | Eteläperä | |
| 6,272,455 B1 | 8/2001 | Hoshen et al. | |
| 6,272,495 B1 | 8/2001 | Hetherington | |
| 6,282,435 B1 | 8/2001 | Wagner et al. | |
| 6,323,853 B1 | 11/2001 | Hedloy | |
| 6,353,925 B1 * | 3/2002 | Stata et al. | 717/112 |
| 6,374,210 B1 | 4/2002 | Chu | |
| 6,460,058 B2 | 10/2002 | Koppolu et al. | |
| 6,499,132 B1 | 12/2002 | Morley et al. | |
| 6,539,348 B1 * | 3/2003 | Bond et al. | 704/9 |
| 6,608,637 B1 | 8/2003 | Beaton et al. | |
| 6,622,306 B1 | 9/2003 | Kamada | |
| 6,678,706 B1 | 1/2004 | Fishel | |
| 6,711,624 B1 | 3/2004 | Narurkar et al. | |
| 6,714,905 B1 | 3/2004 | Chang et al. | |
| 6,714,941 B1 | 3/2004 | Lerman et al. | |
| 6,721,697 B1 * | 4/2004 | Duan et al. | 704/9 |
| 6,785,643 B2 | 8/2004 | Hayosh et al. | |
| 6,920,583 B1 | 7/2005 | Morley et al. | |
| 6,925,635 B2 * | 8/2005 | Garvey | 717/143 |
| 6,944,132 B1 | 9/2005 | Aono et al. | |
| 6,944,588 B2 | 9/2005 | Kempe | |
| 6,952,667 B2 * | 10/2005 | Kempe | 704/9 |
| 6,959,273 B2 * | 10/2005 | Kempe | 704/9 |
| 6,965,858 B2 * | 11/2005 | Kempe | 704/9 |
| 6,990,442 B1 * | 1/2006 | Davis | 704/9 |
| 7,006,881 B1 | 2/2006 | Hoffberg et al. | |
| 7,010,476 B2 | 3/2006 | Karttunen et al. | |
| 7,027,974 B1 * | 4/2006 | Busch et al. | 704/4 |
| 7,027,988 B1 | 4/2006 | Mohri | |
| 7,058,567 B2 * | 6/2006 | Ait-Mokhtar et al. | 704/9 |
| 7,089,541 B2 * | 8/2006 | Ungar | 717/143 |
| 7,146,381 B1 * | 12/2006 | Allen et al. | 1/1 |
| 7,383,185 B1 | 6/2008 | Mohri | |
| 7,464,032 B2 * | 12/2008 | Wang | 704/251 |
| 7,467,181 B2 | 12/2008 | McGowan et al. | |
| 7,475,015 B2 | 1/2009 | Epstein et al. | |
| 7,548,848 B1 * | 6/2009 | Deb et al. | 704/9 |
| 7,552,051 B2 * | 6/2009 | Privault et al. | 704/255 |
| 7,613,610 B1 | 11/2009 | Zimmerman et al. | |
| 7,627,567 B2 | 12/2009 | Ganti et al. | |
| 7,630,892 B2 | 12/2009 | Wu et al. | |
| 7,665,016 B2 * | 2/2010 | Behrens et al. | 715/237 |
| 7,702,677 B2 | 4/2010 | Chang et al. | |
| 7,908,274 B2 * | 3/2011 | Zartler et al. | 707/736 |
| 7,912,705 B2 * | 3/2011 | Wasson et al. | 704/9 |
| 7,970,600 B2 | 6/2011 | Chen et al. | |
| 2002/0046018 A1 * | 4/2002 | Marcu et al. | 704/9 |
| 2002/0165717 A1 * | 11/2002 | Solmer et al. | 704/256 |
| 2002/0194379 A1 | 12/2002 | Bennett et al. | |
| 2003/0004705 A1 * | 1/2003 | Kempe | 704/9 |
| 2003/0069880 A1 * | 4/2003 | Harrison et al. | 707/3 |
| 2004/0024584 A1 | 2/2004 | Brill | |
| 2004/0042591 A1 | 3/2004 | Geppert et al. | |
| 2004/0162827 A1 | 8/2004 | Nakano | |
| 2004/0176945 A1 * | 9/2004 | Inagaki et al. | 704/4 |
| 2005/0022115 A1 | 1/2005 | Baumgartner et al. | |
| 2005/0055345 A1 * | 3/2005 | Ripley | 707/3 |
| 2005/0065967 A1 * | 3/2005 | Schuetze et al. | 707/102 |
| 2005/0108001 A1 | 5/2005 | Aarskog | |
| 2005/0108630 A1 | 5/2005 | Wasson et al. | |
| 2005/0125746 A1 | 6/2005 | Viola et al. | |
| 2005/0234701 A1 | 10/2005 | Graehl et al. | |
| 2005/0256698 A1 * | 11/2005 | Becks | 704/2 |
| 2006/0009969 A1 | 1/2006 | Johnson et al. | |
| 2006/0047691 A1 * | 3/2006 | Humphreys et al. | 707/102 |
| 2006/0069545 A1 | 3/2006 | Wu et al. | |
| 2006/0095250 A1 | 5/2006 | Chen et al. | |
| 2006/0116862 A1 * | 6/2006 | Carrier et al. | 704/1 |
| 2006/0235241 A1 | 10/2006 | Fairweather | |
| 2006/0245641 A1 | 11/2006 | Viola et al. | |
| 2006/0253273 A1 | 11/2006 | Feldman et al. | |
| 2007/0027672 A1 * | 2/2007 | Decary et al. | 704/7 |
| 2007/0083552 A1 * | 4/2007 | Allen et al. | 707/103 R |
| 2007/0113222 A1 * | 5/2007 | Dignum et al. | 717/143 |
| 2007/0185910 A1 | 8/2007 | Koike et al. | |
| 2007/0220063 A1 * | 9/2007 | O'Farrell et al. | 707/201 |
| 2007/0234288 A1 * | 10/2007 | Lindsey et al. | 717/117 |
| 2007/0282833 A1 * | 12/2007 | McMillen | 707/6 |
| 2007/0282900 A1 | 12/2007 | Owens et al. | |
| 2008/0059153 A1 * | 3/2008 | Bennett | 704/9 |
| 2008/0071520 A1 | 3/2008 | Sanford | |
| 2008/0091409 A1 * | 4/2008 | Anderson | 704/9 |
| 2008/0162513 A1 * | 7/2008 | Biard et al. | 707/100 |
| 2008/0263019 A1 * | 10/2008 | Harrison et al. | 707/4 |
| 2008/0281580 A1 * | 11/2008 | Zabokritski | 704/9 |
| 2008/0293383 A1 | 11/2008 | Rastas | |
| 2008/0294441 A1 * | 11/2008 | Saffer | 704/255 |
| 2009/0006994 A1 | 1/2009 | Forstall et al. | |
| 2009/0182710 A1 * | 7/2009 | Short | 707/3 |
| 2009/0193011 A1 * | 7/2009 | Blair-Goldensohn et al. | 707/5 |

(56) References Cited

U.S. PATENT DOCUMENTS

| | | | |
|---|---|---|---|
| 2009/0235280 A1* | 9/2009 | Tannier et al. | 719/318 |
| 2009/0292690 A1 | 11/2009 | Culbert | |
| 2009/0306961 A1 | 12/2009 | Li et al. | |
| 2010/0125836 A1* | 5/2010 | Sazegari et al. | 717/151 |
| 2010/0185668 A1* | 7/2010 | Murphy | 707/771 |
| 2011/0099184 A1 | 4/2011 | Symington | |
| 2011/0239188 A1* | 9/2011 | Lindsey et al. | 717/117 |
| 2012/0096446 A1* | 4/2012 | Miceli | 717/141 |

FOREIGN PATENT DOCUMENTS

| | | |
|---|---|---|
| EP | 0458563 A2 | 11/1991 |
| EP | 0635808 A2 | 1/1995 |
| EP | 0 698 845 A1 | 2/1996 |
| EP | 0458563 B1 | 7/1996 |
| EP | 0 698 845 B1 | 1/2001 |
| EP | 0458563 B2 | 7/2001 |
| JP | 3046855 A | 2/1991 |
| JP | 10040014 A | 2/1998 |
| JP | 11088633 A | 3/1999 |
| WO | 95/34998 A2 | 12/1995 |
| WO | 95/34998 A3 | 12/1995 |
| WO | WO 95/34998 | 12/1995 |
| WO | WO 97/32439 | 9/1997 |
| WO | WO 99/66747 | 12/1999 |
| WO | WO 2008/109835 A2 | 9/2008 |
| WO | WO 2009/041982 A1 | 4/2009 |

OTHER PUBLICATIONS

Chakravarty. "Lazy Lexing is Fast" 1999.*
Orphanos et al. "Decision trees and NLP: A case study in POS tagging" 1999.*
Ait-Mokhtar et al. "Incremental finite-state parsing" 1997.*
Karttunen. "Applications of Finite-State Transducers in Natural-Language Processing" 2001.*
Lieberman et al. "Grammex: Defining Grammars by Example" 1998.*
Lieberman et al. "Training Agents to Recognize Text by Example" 1999.*
Sekine et al. "A decision tree method for finding and classifying names in Japanese texts" 1998.*
Roche. "Parsing with Finite-State Transducers" 1996.*
Faaborg et al. "A Goal-Oriented Web Browser" 2006.*
Brun. "Terminology finite-state preprocessing for computational lfg" 1998.*
Lieberman et al. "Training Agents to Recognize Text by Example" 2000.*
Zhao et al. "Extracting Relations with Integrated Information Using Kernal Methods" 2005.*
Fernando. "Entailments in finite-state temporality" 2005.*
Grover et al. "LT TTT—A Flexible Tokenisation Tool" 2000.*
Hubert. "Lex and YACC primer/HOWTO" 2004.*
Berk. "JLex: A lexical analyzer generator for Java(TM)" 2000.*
Beesley et al. "Finite-State Morphology: Xerox Tools and Techniques" 2002.*
Paxson. "Flex, version 2.5" 1996.*
Wetzel. "Types and Tokens" 2006.*
Begel et al. "XGLR—an algorithm for ambiguity in programming languages" May 19, 2006.*
U.S. Appl. No. 11/710,182, filed Feb. 23, 2007, titled "Pattern Search Methods and Apparatuses," by inventors Olivier Bonnet, et al., 28 pages (specification and drawings).
EUDORA Mail Pro, "Windows Version 3.0 User Manual", Sep. 1996, pp. 3 total.
EUDORA Mail Pro, "Version 3.0 for Windows User Manual", Jun. 1997, pp. 198 total.
EUDORA Mail Light, "Version 3.1 for Macintosh User Manual", Apr. 1997, pp. 190 total.
International Preliminary Report on Patentability and Written Opinion for International PCT No. PCT/US2008/002263, mailed on Sep. 3, 2009, pp. 8 total.
Lin et al., "Postal Address Detection from Web Documents", IEEE Computer Society, copyright 2005, pp. 6 total.
Lerman, Kristina et al., "Automatically Labeling the Inputs and Outputs of Web Services", Proceedings of the National Conference on Artificial Intelligence (AAAI-2006), Menlo Park, CA, 2006, 6 pages.
Lerman, Kristina et al., "Populating the Semantic Web", Proceedings of the AAAI 2004 Workshop on Advances in Text Extraction and Mining, 2004, 6 pages.
Lerman, Kristina et al., "Wrapper Maintenance: A Machine Learning Approach", Journal of Artificial Intelligence Research, 18 (2003), pp. 149-181.
PCT International Search Report and Written Opinion for PCT International Appln. No. US2008/002263, mailed Aug. 4, 2008 (12 pages).
Apple Internet Address Detectors User's Manual, Aug. 28, 1997, pp. 1-15.
MacWeek Report, Aug. 8, 1996, 2 pgs.
EMailman(sm) Internet Address Detectors, http://www.emailman.com/mac/iad.html, Jan. 12, 2004, 3 pgs.
MacAddicts at MacWorld, exclusive.gif, 5 pgs, 1996.
Apple Data Detectors, Dec. 30, 1996, 7 pgs.
Welcome to Apple Data Detectors, Apple Data Detectors, Mar. 4, 1997, 19 pgs.
Claris for Macintosh, 62 pages.
Welcome to Apple Data Detectors, Apple Data Detectors, Apr. 8, 1997, 11 pgs.
James Staten, Special Report Apple Looks to the Future, James Staten, Ziff-Davis Publishing, Aug. 7, 1996, 2 pgs.
Mike Langberg, Show of Potential Apple Breaks New Ground by Displaying What's on Its Drawing Board "Innovation Is at the Heart of What We Do", Aug. 7, 1996, San Jose Mercury News, 2 pgs.
Apple Introduces Internet Address Detectors, Technology Makes It Easier to Manage and Perform Actions with Internet Addresses; Extends Innovative Capabilities Delivered with Mac OS 8, http://www.apple.com/pr/library/1997/q4/970908.pr.rel.internet.
html,Sep. 8, 1997, 3 pgs.
The AppleScript Sourcebook—AppleScript Editors, AppleScript Editors, Utilities & Environments, Tools for creating and using AppleScript scripts, including editors, application generators, utilities, and command-line, menu and button bar execution environments, webmaster@applescriptsourcebook.com, http://www.AppleScriptSourcebook.com/links/applescripteditors.html, Oct. 13, 2002, 6 pgs.
ADD Depot, http://web.archive.org/web/20000819081818/http://homepage.mac.com/matthewmiller/add/, 4 pgs., Jan. 12, 2004.
Thomas Bonura and James R. Miller ,Drop Zones, An Extension to LiveDoc, http://www.acm.org/sigchi/bulletin/1998.2/bonura.html ,SIG CHI, vol. 30, No. 2, Apr. 1998, 9 pgs.
Thomas Bonura and James R. Miller ,From Documents to Objects, An Overview of LiveDoc, SIGCHI Bulletin vol. 30 No. 2, Apr. 1998: From Documents to Objects, SIG CHI, vol. 30, No. 2, Apr. 1998, 11 pgs.
Bonnie A. Nardi, James R. Miller, and David J. Wright, Collaborative,Programmable Intelligent Agents, Mar. 1998/vol. 41, No. 3 Communications of the ACM, pp. 96-104.
A Farewell to the Apple Advanced Technology Group, http://www.acm.org/sigchi/bulletin/1998.2/, SIG CHI, vol. 30, No. 2, Apr. 1998, 3 pgs.
Apple Internet Address Detectors User's Manual, Aug. 28, 1997, 16 pgs.
What are Apple Data Detectors?, JRM (ver 4.0),Copyright © 1997 Apple Computer, Inc., 5 pgs.
The Apple Data Detectors FAQ, JRM (v. 4.0), Copyright © 1997 Apple Computer, Inc., 3 pgs.
Gregory D. Abowd, Anind Dey, Andy M. Wood, Applying Dynamic Integration as a Software Infrastructure for Context-Aware Computing, 10 pgs.
Milind S. Pandit and Sameer Kalbag,The Selection Recognition Agent: Instant Access to Relevant Information and Operations, IUI 97, Orlando Florida USA, © 1997 ACM 0-89791-839-8/96/01, pp. 47-52.
Gregory D. Abowd, Anind K. Dey, Robert Orr & Jason Brotherton, Context-Awareness in Wearable and Ubiquitous Computing, Pro-

(56) References Cited

OTHER PUBLICATIONS ceedings of the First International Symposium on Wearable Computers (ISWC '97) 0-8186-8192-6/97 © 1997 IEEE, 3 pgs.
Andrewwood, Anind Dey, Gregory D. Abowd, CyberDesk: Automated Integration of Desktop and Network Services, CHI 97. Atlanta GA USA,Copyright 1997 ACM 0-g9791-802-9/97/03, 2 pgs.
QUALCOMM, Eudora ProTM for Newton®, Version 1.0 for Newton 2.0 and 2.1, pp. 1-22, pp. 1-28.
Newton, Apple MessagePad Handbook, pp. 1-358, pp. 1-196.
Newton Solutions Guide, Software, Peripherals and Accessories for Newton PDAs, 64 pgs.
James R. Miller and Thomas Bonura ,From Documents to Objects an Overview of LiveDoc, SIGCHI Bulletin vol. 30, No. 2, Apr. 1998, pp. 3-58.
James R. Miller and Thomas Bonura ,Drop Zones an Extension, SIGCHI Bullelin vol. 30, No. 2 Apr. 1998, pp. 59-63.
Chris Schmandt, Phoneshell: the Telephone as Computer Terminal, 10 pgs.
Hul Wang, David Bell, John Hughs, Piyush Ojha, Neural network approach to relevance, IEEE, 1995, pp. 1961-1965.
Cara Cunningham, Apple kicks off Macworld with talk of revival, new software demos, InfoWorld Electric, Jan. 11, 2004, 2 pgs.
Writing new detectors for Apple Data Detectors, Copyright © 1997, Apple Computer, Inc., 8 pgs.
Welcome tq.AppleWeb, 1997, 4 pgs.
Apple Data Detectors, Apple Inc., 1997, 4 pgs.
Contextual Menu Manager/Apple Data Detectors, 6 pgs.
Apple Introduces Internet Address Detectors, http://www.apple.com/pr/library/1997/q4/97090S.pr.rel.internet.html , 1997, 44 pgs.
Developer's Guide to Apple Data Detectors, for version 1.0.2, Apple Computer, Inc., Dec. 1, 1997, 34 pgs.
Apple Data Detectors User's Manual, Copyright © 1997 Apple Computer, Inc., 16 pgs.
Communications of the ACM, Mar. 1998—vol. 41, No. 3, 12 pgs.
First International Symposium on Wearable Computers, IEEE, Oct. 13-14, 1997, 8 pgs.
CHI 97 Human Factors in Computing Systems, Mar. 22-27, 1997, 9 pgs.
Proceedings of the ACM Symposium on User Interface Software and Technology, UIST 97, 10th Annual Symposium on User Interface Software and Technology,Oct. 14-17, 1997, 9 pgs.
CyberDesk: A Framework for Providing Self-Integrating Ubiquitous Software Services, Anind K. Dey, Gregory Abowd, Mike Pinkerton, Andrew Wood, 10 pgs.
Milind S. Pandit, Sameer Kalbag, The Selection Recognition Agent: Instant Access to Relevant Information and Operations, Copyright © 1997 ACM 0-089791-839-8/96/01.
Michael David Pinkerton, Ubiquitous Computing: Extending Access to Mobile Data, Georgia Institute of Technology, May 1997, 98 pgs.
1997 International Conference on Intelligent User Interfaces,IUI97 Conference Proceedings, ACM, Jan. 6-9, 1997, 14 pgs.
Proceedings of the Third Annual Conference on Autonomous Agents, ACM, May 1-5, 1999.
Dunn, JM and Stern, EH,Touch-Screen/Graphics Receive Message Application, IBM TDB, IPCOM000111975D Apr. 1, 1994,TDB v37 n4A 04-94 p. 451-454, Mar. 26, 2005, 5 pgs.
Chris O'Malley,Simonizing the PDA, BellSouth's communicative Simon is a milestone in the evolution of the PDA, http://web.archive.org/web/19990221174856/byte.com/a rt/9412/sec11/art3.htm, Dec. 1994, 7 pgs.
Salahshour, A and Williams, ML, Preferred Media Communication Establishment Mechanism, IBM Technical Disclosure Bulletin, vol. 37 No. 03 Mar. 1994, 3 pgs.
Gregory D. Abowd, Anind K. Dey, and Andrew Wood, Future Computing Environments, Applying Dynamic Integration as a Software Infrastructure for Context-Aware Computing, Cyberdesk, 1998, 17 pgs.
Gregory D. Abowd, Anind K. Dey, Gregory Abowd, Robert Orr & Jason Brotherton, Future Computing Environments , Context-Awareness in Wearable and Ubiquitous Computing, 1997, 15 pgs.
Anind K. Dey, Gregory D. Abowd, Future Computing Environments ,PUI Workshop Submission, CyberDesk: The Use of Perception in Context-Aware Computing, 5 pgs.
Anind K. Dey, Future Computing Environments, Context-Aware Computing: The CyberDesk Project, Mar. 23-25, 1998, 9 pgs.
Anind K. Dey , Gregory D. Abowd, Mike Pinkerton, and Andrew Wood, Future Computing Environments, CyberDesk: A Framework for Providing Self-Integrating Ubiquitous Software, 1997, 18 pgs.
Apple Introduces Internet Address Detectors, Technology Makes it Easier to Manage and Perform Actions with Internet Addresses; Extends Innovative Internet CapabiUties Delivered with Mac OS 8, Sep. 8, 1997, 44 pgs.
Shawn Willett, T. Quinlan, "Novell seeking object framework for NetWare," News/Networking,LexisNexis, Info World Media Group, May 2, 1994, pp. 45.
Charles Babcock, "A matter of choice: Charting an object-oriented course depends on what you want to do when," CSJ, Object Technology, LexiNexis, ComputerWorld, May 1, 1994, pp. 59.
Tom Quinlan, Novell eyes larger role in OpenDoc: WordPerfect purchase fuels push, Top of the News, LexisNexis, Info World Media Group, Apr. 11, 1994, pp. 1.
Melinda-Carol Ballou, CW Staff, "Object technologies draw good reviews: Some cite shortcomings in Microsoft model," Application Development, LexisNexis, ComputerWorld, Mar. 21, 1994, pp. 91.
Newsbytes, Watcom Launches New C/C++ Tools, Deals, LexisNexis, Post-Newsweek Business Information Inc., Mar. 17, 1994, Waterloo, Ontario, Canada.
Bob Metcalfe, "Platform Olympic teams converge on CORBA?," From the Ether, LexisNexis, Info World Media Group, Mar. 7, 1994.
Newsbytes, "Object World—IBM's SOM is Stepping Stone to Taligent," LexisNexis, Post-Newsweek Business Information Inc., Boston, MA., Jan. 18, 1994.
Newsbytes, "Object World—DEC Presents Plans for OLE & COM," LexisNexis, Post-Newsweek Business Information Inc., Boston, MA., Jan. 18, 1994.
John Blackford, "IBM offers a peek at tomorrow's software: marketing strategy for OS/2 operating system," Direct from the editor, Column, LexisNexis, Gale Group, vol. 14 No. 1,Jan. 1, 1994, pp. 58.
Willem Knibbe, "Microsoft, DEC craft object model: Claims of object access across nine platforms raise vendors' eyebrows," LexisNexis, Info World Media Group, Dec. 6, 1993, pp. 1.
Ed Scannell, V. McCarthy, "Object System to aid corporate downsizing," News: PC Expo, LexisNexis, Info World Media Group, Jul. 5, 1993, pp. 8.
Jeanette Borzo, T. Quinlan, "WordPerfect and Novell plan to adopt OpenDoc: Apple architecture lets users read, edit document across platforms," News: PC Expo, LexisNexis, Info World Media Group, New York, NY, Jul. 5, 1993, pp. 8.
Exhibit 647-1 (Nov. 24, 2010), Claim Chart "Perspective System," References cited: Perspective Source Code 1992-93 (Code), Pensoft Corporation, Perspective Handbook, Nov. 1992 (Handbook), pp. 46.
Exhibit 647-4 (Nov. 24, 2010), Claim Chart "WordPerfect," Reference cited: Novell, WordPerfect User's Guide (MAC), V 3.1, 1994 (WP Users Guide), NeXT Computer, Inc., "NeXTSTEP General Reference—Release 3, vol. 2" (1992) ("Reference 2"), pp. 33.
Exhibit 647-7 (Nov. 24, 2010), Claim Chart "European Patent Office Publication No. 0 458 563 A2," References cited: European Patent Office Publication No. 0 458 563 A2 to Nokia Mobile Phones Ltd (published Nov. 27, 1991) (NokiaEP563), U.S. Patent No. 5,437,036 to Microsoft Corporation (filed Sep. 3, 1992) (Stamps), U.S. Patent No. 5,649,222 to Microsoft Corporation (filed May 8, 1995) (Mogilevsky), Koved and Ben Shneiderman, Embedded Menus: Selecting Items in Context (Communications of the ACM, vol. 29 No. 4 Apr. 1986) (Koved), pp. 20.
Exhibit 647-8 (Nov. 24, 2010), Claim Chart "NeXTSTEP Release 3," References cited: NeXT Computer, Inc., NeXTSTEP General Reference—Release 3, vol. 1, (1992) (Reference), NeXT Computer, Inc., NeXTSTEP General Reference—Release 3, vol. 2, (1992) (Reference 2), Video, Steve Jobs Demos NeXTSTEP (Steve Jobs Demo), Larry Koved and Ben Shneiderman, Embedded Menus: Selecting Items in Context, Communications of the ACM, vol. 29, No. 4. p. 312-318, Apr. 1986, (Koved), pp. 35.

(56) References Cited

OTHER PUBLICATIONS

Exhibit 647-10 (Nov. 24, 2010), Claim Chart "Apple Newton", References cited: Apple Computer, Inc., Newton Programmer's Guide, 1993 (Guide), Apple Computer, Inc., Newton Programmer's Guide for Newton 2.0, 1996 (Guide 2), Pensoft Corporation, Perspective Handbook, Nov. 1992 (Handbook), pp. 44.
Exhibit 647-13 (Nov. 24, 2010), Claim Chart "U.S. Patent No. 5,483,352," References cited: U.S. Patent No. 5,483,352 assigned to Fujitsu (Fukuyama at filing date Aug. 26, 1993) (Fukuyama), pp. 19.
Exhibit 647-15 (Nov. 24, 2010), Claim Chart "GNU Emacs—goto-addr.el," References cited: Eric Ding, GNU Emacs: goto-addr.el extension, Aug. 15, 1995 (goto-addr), Larry Koved and Ben Shneiderman, Embedded Menus: Selecting Items in Context, Communications of the ACM, vol. 29, No. 4. p. 312-318. Apr. 1986. (Koved), pp. 17.
Exhibit 647-16 (Nov. 24, 2010), Claim Chart "Eager," References cited: Allen Cypher, Programming Repetitive Tasks by Example, 1991 (Eager), Eager Video by Allen Cypher (Eager Video), Edited by Allen Cypher, Watch What I do: Programming by Example, (1993) (Watch What I Do), U.S. Patent No. 5,859,636 to Intel Corporation (filed Dec. 27, 1995) (Pandit), Gerald Salton, Automatic Text Processing: The Transformation, Analysism and Retrieval of Information by Computer, 1989 (Salton), pp. 24.
Nokia Supplemental Response to Interrogatories (Nov. 17, 2010): Invalidity Claim Charts based on U.S. 5,859,636; Newton Apple Message Pad Handbook; U.S. 5,434,777; U.S. 5,477,447; U.S. 5,815,142; U.S. 5,483,352; and EP0458563.
Kum-Yew Lai, T.W. Malone, K-C. Yu, "Object lens: a "spreadsheet" for cooperative work," ACM Transactions on Information Systems (TOIS) TOIS, vol. 6 Issue 4, Oct. 1988, Acm, New York, NY, pp. 332-353.
Samuel J. Leffler, M. Kirk, M.J. Karels, J.S. Quarterman, "The Design and Implementation of 4.3 BSD UNIX Operation System Answer Book," Addison-Wesley Publishing, 1989, pp. 471.
Don Libes, "Exploring Expert: a tcl-based toolkit for automating interactive programs," O'Reilly & Associates Inc., Jan. 1995, Sebastopol, CA, pp. 566.
Henry Lieberman, "Demonstrational Techniques for Instructible User Interface Agents," AAAI Technical Report SS-94-03, AAAI, 1994, Cambridge, MA, pp. 107-109.
Henry Lieberman, B. Nardi, D. Wright, "Training agents to recognize text by example," Agents '99 Proceedings of the third annual conference on Autonomous Agents, ACM, New York, NY, 1999, pp. 116-122.
Pattie Maes, "Agents that reduce work and information overload," Communications of the ACM, vol. 37 Issue 7, Jul. 1994, ACM, New York, NY, pp. 30-40.
Thomas W. Malone, K. Lai, C. Fry, "Experiments with Oval: A Radically Tailorable Tool for Cooperative Work," ACM Transactions on Information Systems (TOIS),vol. 13 Issue 2, Apr. 1995, ACM, New York, NY, pp. 177-205.
Hausi A. Muller, S.R. Tilley, K. Wong, "Understanding software systems using reverse engineering technology perspectives from the Rigi project," CASCON '93 Proceedings of the 1993 conference of the Centre for Advanced Studies on Collaborative research: software engineering—vol. 1,IBM Press, 1993, pp. 217-226.
Brad A. Myers, W. Buxton, "Creating highly-interactive and graphical user interfaces by demonstration," SIGGRAPH '86 Proceedings of the 13th annual conference on Computer graphics and interactive techniques, vol. 20 Issue 4, Aug. 1986, ACM, New York, NY, pp. 249-258.
Bonnie A. Nardi, V. O'Day, "Intelligent Agents: What We Learned at the Library," Libri. Volume 46 Issue 2, Jan. 1996, Cupertino, CA, pp. 59-88.
Bonnie A. Nardi, J.R. Miller, D.J. Wright, "Collaborative, programmable intelligent agents," Communications of the ACM, vol. 41 Issue 3, Mar. 1998, ACM, New York, NY, pp. 96-104.
Netscape Communication Corporation, "Netscape's DDE Implementation," Netscape Communications Corporation, Mar. 22, 1995, pp. 16.
Netscape Communication Corporation, R. Silino, "Netscape Unveils Netscape Navigator 1.1," PR Newswire, Mar. 6, 1995, Mountain View, CA, pp. 3.
Netscape Communication Corporation, "Netscape Communications Ships Release 1.0 of Netscape Navigator and Netscape Servers," Netscape News Release, Mar. 15, 1994, Mountain View, CA, pp. 2.
Christopher Bey, Apple Press, "Newton Programmer's Guide: for Newton 2.0," Addison-Wesley Publishing, Cupertino, CA, 1996, pp. 928.
Christopher Bey, B. Anders, J. Perry, J. Simonoff, "Newton Programmer's Guide," The Apple Publishing System, Cupertino, CA, 1994, pp. 893.
John Markoff, "Microsoft Comes to the Aid of a Struggling Apple," New York Times, Boston, MA, Aug. 7, 1997, pp. 2.
NeXT Computer Inc., "NeXT Technical Summaries," NeXT Computer Inc., Redwood City, CA, Dec. 1990, pp. 365.
NeXT Computer Inc., "NXBundle," NeXT Computer Inc., 1995, pp. 10.
NeXT Computer Inc., "OpenStep Specification," NeXT Computer Inc., Oct. 19, 1994, pp. 518.
Gary Miller, J. Inscore, "NeXT Development Tools," NeXT Computer Inc, Redwood City, CA, 1990, pp. 254.
NeXT Computer Inc., "NeXTSTEP programming interface summary, release 3," Addison-Wesley, 1992, pp. 467.
NeXT Computer Inc., "NeXTStep 3.3: Developer Documentation Manuals," NeXT Software Inc., 1994.
Stan Augarten, H. Casabona, C. Rose, H. Ross, L. Koponen, "The NeXT User's Reference Manual," NeXT Inc., Redwood City, CA, 1989, pp. 450.
NeXT Publications, "NeXTStep User Interface Guidelines: Release 3," Addison-Wesley, Apr. 1993, pp. 184.
Gary Miller, K. Walrath, "NeXT Operating System Software," NeXT Computer Inc., Redwood City, CA, 1990, pp. 244.
NeXT Publications, "Development Tools and Techniques: Release 3," Addison-Wesley, Nov. 1993, pp. 453.
NeXT Publications, "NeXTStep: Object-Oriented Programming and the Objective C Language: Release 3," Addison-Wesley, Nov. 1993, pp. 240.
NeXT Publications, "NeXTStep: Programming Interface Summary," Addison-Wesley, Apr. 1993, pp. 466.
NeXT Computer Inc., "3.3 Release Notes: C Compiler," NeXT Computer Inc., 1995, pp. 149.
NeXT Publications "NeXTStep: General Reference vol. 1: Release 3," Addison-Wesley, Nov. 1992, pp. 1230.
NeXT Publications "NeXTStep: General Reference vol. 2: Release 3," Addison-Wesley, Nov. 1992, pp. 1356.
NeXT Publications "NeXTStep: Operating System Software," Addison-Wesley, Sep. 1992, pp. 451.
Alex Duong Nghiem, "NeXTSTEP programming: concepts and applications," Prentice-Hall, Inc., Upper Saddle River, NJ, 1993, pp. 604.
Andrew J. Novobilski, "PenPoint programming: edition 1," Addison-Wesley, Reading, Ma., 1992, pp. 385.
Milind S. Pandit, S. Malbag, "The selection recognition agent: instant access to relevant information and operations," IUI '97 Proceedings of the 2nd international conference on Intelligent user interfaces, ACM, New York, NY, 1997, pp. 47-52.
Pensoft Corp., "Pensoft Corp.: Announces Perspective Built into Every EO Personal Communicator 440 and 880 Models," PR Newswire, Redwood City, CA, Nov. 4, 1992, pp. 1.
Pensoft Corp., "Pensoft Corp.: Announcement of Shipping," PR Newswire, Redwood City, CA, Jan. 11, 1993, pp. 1.
Pensoft Corp., "Pensoft Corp.: Perspective Handbook," Pensoft Corp. Redwodd City, CA, Nov. 1992, pp. 278.
Tom Quinlan, "OpenDoc will lack networking support: WordPerfect, Apple forego DSOM initially," LexisNexis, Info World Media Group, Aug. 15, 1994, pp. 1-2.
Daniel E. Rose, C. Stevens, "V-Twin: A Lightweight Engine for Interactive Use," Apple Research Laboratories, Apple Computer, Inc., Cupertino, CA, 1996, pp. 12.
Gerard Salton, "Automatic text processing: the transformation, analysis, and retrieval of information by computer," Addison-Wesley Longman Publishing Co., Inc., Boston, MA, 1989, pp. 248-266.

(56) References Cited

OTHER PUBLICATIONS

Gerard Salton, C. Buckley, "Automatic text structuring and retrieval-experiments in automatic encyclopedia searching," SIGIR '91 Proceedings of the 14th annual international ACM SIGIR conference on Research and development in information retrieval, ACM, New York, NY, 1991, pp. 21-30.
Jeffrey C. Schlimmer, L.A. Hermens, "Software agents: completing patterns and constructing user interfaces," Journal of Artificial Intelligence Research, vol. 1 Issue 1, Aug. 1993, pp. 61-89.
Michael A. Schoonover, J.S. Bowie, W.R. Arnold, "GNU Emacs: UNIX Text Editing and Programing," Addison-Wesley, Reading, MA, Jan. 1996, pp. 609.
Stephanie Seneff, "A relaxation method for understanding spontaneous speech utterances," HLT '91 Proceedings of the workshop on Speech and Natural Language, Association for Computational Linguistics Stroudsburg, PA, 1992, pp. 299-304.
Michael B. Shebanek, "The Complete Guide to the Nextstep User Environment," Springer Verlag, Aug. 1, 1993, New York, NY, Telos the Electronic Library of Science, Santa Clara, CA, pp. 466.
Walter R. Smith, "Using a Prototype-based Language for User Interface: The Newton Project's Experience," OOPSLA '95 Proceedings of the tenth annual conference on Object-oriented programming systems, languages, and applications, ACM, New York, NY, 1995, pp. 61-72, ACM SIGPLAN Notices, vol. 30 Issue 10, Oct. 17, 1995, pp. 61-72.
Walter R. Smith, "The Newton Application Architecture," Proc. of the 39th IEEE Computer Society Int. Conference, pp. 156-161, San Francisco, 1994.
Bruce F. Webster, "The NeXT Book," Addison-Wesley, Reading, MA, 1989, pp. 387.
Robert Welland, G. Seitz, L. Wang, L. Dyer, T. Harrington, D. Culbert, "The Newton Operating System," To appear in Proceedings of the 1994 IEEE Computer Conference, IEEE, San Francisco, CA, 1994, pp. 8.
Apple Computer Inc., Newton Programmer's Guide: System Software, vol. 2, First Edition, 1995, Apple Inc., Cupertino, CA.
Milind S. Pandit, S. Kalbag, "The selection recognition agent: instant access to relevant information and operations," IUI '97 Proceedings of the 2nd international conference on Intelligent user interfaces, ACM, New York, NY, 1997, pp. 47-52.
Melinda-Carol Ballou, CW Staff, "Through cooperation come standards," Appl/Dev, ComputerWorld, May 16, 1994, pp. 85.
L. Nancy Garrett, K.E. Smith, N. Meyrowitz, "Intermedia: issues, strategies, and tactics in the design of a hypermedia document system," CSCW '86 Proceedings of the 1986 ACM conference on Computer-supported cooperative work, ACM, New York, NY, 1986, pp. 163-174.
Nokia Corporation, "Nokia 2110: User's Guide," Nokia Mobile Phones, 1994, pp. 52.
Microsoft Corporation, "User'S Guide Microsoft Word: The World's Most Popular Word Processor version 6.0," Microsoft Corporation, 1993, pp. 606.
Kenneth W. Church, L.F. Rau, "Commercial applications of natural language processing," Communications of the ACM CACM Homepage archive vol. 38 Issue 11, Nov. 1995, ACM, New York, NY, pp. 71-79.
Apple Computer Inc., Newton Programmer's Guide: System Software, vol. 1, First Edition, 1995, Apple Inc., Cupertino, CA.
Apple Computer Inc., "Revision to the Mar. 14, 1993 developer confidential price list," Apple Computer Inc, Cupertino, CA, Apr. 25, 1995, pp. 24.
Apple Computer Inc., "Revision to the Aug. 2, 1994 developer confidential price list," Apple Computer Inc, Cupertino, CA, Sep. 12, 1994, pp. 25.
Apple Computer Inc., "Revision to the Oct. 17, 1994 collegiate partnership program level 1 confidential price list," Apple Computer Inc, Cupertino, CA, Nov. 14, 1994, pp. 26.
Exhibit 647-1, Claim Chart "Perspective System," References cited: Perspective Source Code 1992-93 (Code), Pensoft Corporation, Perspective Handbook, Nov. 1992 (Handbook), pp. 46.
Exhibit 647-10, Claim Chart "Apple Newton", References cited: Apple Computer, Inc., Newton Programmer's Guide, 1993 (Guide), Apple Computer, Inc., Newton Programmer's Guide for Newton 2.0, 1996 (Guide 2), Pensoft Corporation, Perspective Handbook, Nov. 1992 (Handbook), pp. 44.
Exhibit 647-13, Claim Chart "U.S. Patent No. 5,483,352," References cited: U.S. Patent No. 5,483,352 assigned to Fujitsu (Fukuyama at filing date Aug. 26, 1993) (Fukuyama), pp. 19.
Exhibit 647-15, Claim Chart "GNU Emacs—goto-addr.el," References cited: Eric Ding, GNU Emacs: goto-addr.el extension, Aug. 15, 1995 (goto-addr), Larry Koved and Ben Shneiderman, Embedded Menus: Selecting Items in Context, Communications of the ACM, vol. 29, No. 4. p. 312-318. Apr. 1986. (Koved), pp. 17.
Exhibit 647-16, Claim Chart "Eager", References cited: Allen Cypher, Programming Repetitive Tasks by Example, 1991 (Eager), Eager Video by Allen Cypher (Eager Video), Edited by Allen Cypher, Watch What I do: Programming by Example, (1993) (Watch What I Do), U.S. Patent No. 5,859,636 to Intel Corporation (filed Dec. 27, 1995) (Pandit), Gerald Salton, Automatic Text Processing: The Transformation, Analysis, and Retrieval of Information by Computer, 1989 (Salton), pp. 24.
Exhibit 647-4, Claim Chart "WordPerfect," Reference cited: Novell, WordPerfect User's Guide (MAC), V 3.1, 1994 (WP Users Guide), NeXT Computer, Inc., "NeXTSTEP General Reference—Release 3, vol. 1" (1992) ("Reference"), NeXT Computer, Inc., "NeXTSTEP General Reference—Release 3, vol. 2" (1992) ("Reference 2"), pp. 33.
Exhibit 647-7, Claim Chart "European Patent Office Publication No. 0 458 563 A2," References cited: European Patent Office Publication No. 0 458 563 A2 to Nokia Mobile Phones Ltd (published Nov. 27, 1991) (NokiaEP563), U.S. Patent No. 5,437,036 to Microsoft Corporation (filed Sep. 3, 1992) (Stamps), U.S. Patent No. 5,649,222 to Microsoft Corporation (filed May 8, 1995) (Mogilevsky), Koved and Ben Shneiderman, Embedded Menus: Selecting Items in Context (Communications of the ACM, vol. 29 No. 4 Apr. 1986) (Koved), pp. 20.
Exhibit 647-8, Claim Chart "NeXTSTEP Release 3," References cited: NeXT Computer, Inc., NeXTSTEP General Reference—Release 3, vol. 1, (1992) (Reference), NeXT Computer, Inc., NeXTSTEP General Reference—Release 3, vol. 2 (1992) (Reference 2),Video, Steve Jobs Demos NeXTSTEP (Steve Jobs Demo), Larry Koved and Ben Shneiderman, Embedded Menus: Selecting Items in Context, Communications of the ACM, vol. 29, No. 4. p. 312-318, Apr. 1986, (Koved), pp. 35.
Exhibit 647-11, Claim Chart "Netscape Navigator,"References cited: Netscape Navigator version 1.0, Dec. 1994 (Netscape 1.0), Netscape Navigator version 1.1, Mar. 1995 (Netscape 1.1), http://graphcomp.com/info/specs/nets/ddeapi.html, Apr. 1995 (DDE), pp. 18.
Exhibit 647-12, Claim Chart "More Command in 4.3BSD," References cited: University of California, Berkeley, BSD General Commands Manual—More Command in 4.3BSD, Jul. 24, 1990 (Manual), 4.3BSD-Reno Source Code, comp.archives (USENET newsgroup), Jul. 6, 1990, (Code), Samuel J. Leffler, Marshall Kirk McKusick, Michael J. Karels, and John S. Quarterman, The Design and Implementation of the 4.3BSD UNIX Operating System, Nov. 1989 (Leffler), pp. 18.
Exhibit 647-14, Claim Chart "GNU Emacs," References cited: GNU Emacs (Version 18.59) Source Code, Oct. 31, 1992 (EmacsSrc), Michael A. Schoonover, John S. Bowie, William R. Arnold, GNU Emacs: UNIX Text Editing and Programming, 1992 (Schoonover), pp. 33.
Exhibit 647-6, Claim Chart "OPENSTEP," References cited: NeXT Computer, Inc., OPENSTEP Specification, Oct. 19, 1994 (Specification), pp. 23.
Appendix 10, Claim Chart "U.S. Patent No. 5,483,352," References cited: U.S. Patent No. 5,483,352 (filed Aug. 26, 1993) (Fukuyama), Gerald Salton, Automatic Text Processing: The Transformation, Analysis, and Retrieval of Information by Computer (Michael A. Harrison ed., Addison-Wesley 1989) (Salton), pp. 33.
Appendix 13, Claim Chart "Netscape Navigator 1.0 and 1.1," References cited: Screenshots of Netscape Navigator version 1.1, Mar. 1995 (Netscape 1.1), Gerald Salton, Automatic Text Processing: The

(56) References Cited

OTHER PUBLICATIONS

Transformation, Analysis, and Retrieval of Information by Computer (Michael A. Harrison ed., Addison-Wesley 1989) (1989) (Salton), pp. 46.
Appendix 15, Claim Chart "Selection Recognition Agent," References cited: Milind S. Pandit and Sameer Kalbag, The Selection Recognition Agent: Instant Access to Relevant Information and Operations, ACM 1997 (SRA), pp. 28.
Appendix 5, Claim Chart "Perspective Handbook," References cited: Pensoft Corporation, Perspective Handbook (1992) ("Handbook"), Gerald Salton, Automatic Text Processing: The Transformation, Analysis, and Retrieval of Information by Computer (Michael A. Harrison ed., Addison-Wesley 1989) (Salton), pp. 43.
EMAP Media, "IBM's answer to OLE: IBM's and partners' OpenDoc provides open, distributed component-based software architecture to Microsoft's OLE," Brief Article, Product Announcement, Gale Group Inc., pp. 16.
Doug Barney, "Big Blue pitches a play-by-play of its OS plan," News/Software; Technology Analysis, LexiNexis, Info World Media Group, Jul. 11, 1994, pp. 21.
Tom Quinlan, "WordPerfect shipping alpha of OpenDoc," News, LexiNexis, Info World Media Group, New York, Jul. 4, 1994, pp. 8.
Ed Scannell, C. Stedman, CW Staff, "IBM eyes new APIs: Reorganization targets object developers enterprisewide," News, LexisNexis, Computerworld, May 30, 1994, pp. 4.
Edventure Holdings, "Component Software: competition between OpenDoc and OLE 2.0: includes related articles on object infrastructures and price Waterhouse's new auditing system," LexisNexis, Gale Group Inc., vol. 94 No. 5, May 25, 1994, pl. 6, pp. 1.
Edventure Holdings, "OpenDoc: the component guild," LexisNexis, Gale Group Inc., vol. 94 No. 5, May 25, 1994, pl. 3, pp. 17.
Newsbytes, "Apple, IBM, Sci-Atlanta Seek Interactive Apps," LexisNexis, Post-Newskeek Business Information Inc, Atlanta, Georgia, May 24, 1994, pp. 1.
Eve Wilson, "Links and structures in hypertext databases for law," Hypertext: concepts, systems and applications, Cambridge University Press, New York, NY, 1992, pp. 194-211.
Eric A. Bier, "Embedded Buttons: Documents as user interfaces," UIST '91 Proceedings of the 4th annual ACM symposium on User interface software and technology, ACM, New York, NY, 1991, pp. 45-53.
Scott C. Deerwester, K. Waclena, M. Lamar, "A textual object management system," SIGIR '92 Proceedings of the 15th annual international ACM SIGIR conference on Research and development in information retrieval, ACM, New York, NY, 1992, pp. 126-139.
Chris Schmandt, "Phoneshell: the telephone as computer terminal," MULTIMEDIA '93 Proceedings of the first ACM international conference on Multimedia, ACM, New York, NY, 1993, pp. 373-382.
Larry Koved, B. Shneiderman, "Embedded menus: selecting items in context," Magazine Communications of the ACM, vol. 29, Issue 4, Apr. 1986, ACM, New York, NY, pp. 312-318.
A. Williams Salahshour, "Preferred Media Communication Establishment Mechanism," IBM Technical Disclosure Bulletin, Mar. 1994, Dallas, pp. 169-170.
J.M. Dunn, E.H. Stern, "Touch-Screen/Graphics Receive Message Application," IBM Technical Disclosure Bulletin, vol. 37, No. 04A, Apr. 1994, pp. 451-454.
Phil Hayes, "NameFinder: Software That Finds Names in Text," Proceedings RIAO 94, vol. 1, Issue 11-13. October, New York, pp. 762-774, 1994.
Kenneth W. Church, L. Rau, "Natural Language Processing," Magazine Communications of the ACM, vol. 38, Issue 11, Nov. 1995, ACM New York, NY, pp. 71-79.
Bruce Krulwich, C. Burkey, "Intelligent Talk-and-Touch Interfaces Using Multi-Modal Semantic Grammars," Proceedings, Fourth Bar Ilan Symposium on Foundations of Artificial Intelligence, AAAI, 1995, pp. 103-112.

Kevin Knabe, "Apple guide: a case study in user-aided design of online help," Proceeding CHI '95 Conference companion on Human factors in computing systems, ACM New York, NY, 1995, pp. 286-287.
Hui Wang, D. Bell, J. Hughs, P. Ojha, "Neutral Network Approach to Relevance," Neural Networks, 1995. Proceedings, IEEE International Conference, vol. 4, Perth, WA, Australia, pp. 1961-1965.
Apple Computer Inc. "Newton Apple MessagePad Handbook," Apple Inc., Cupertino, CA, 1995, pp. 1-358.
John Stone, K. Newby, L. Dorsey, P. Ivanier, "The Newton Solutions Guide: Software, Peripherals and Accessories for Newton PDAs," Published by JointSolutions Marketing, 1995, pp. 1-64.
Keith Bostic, "V1.90: 4.3BSD-Reno/ Fourth Berkeley Software Distribution," Com.Archives, Jul. 6, 1990, pp. 1-11.
Maristella Agosti, M. Melucci, F. Crestani, "Automatic authoring and construction of hypermedia for information retrieval," Journal: Multimedia Systems—Special issue on content-based retrieval archive, vol. 3 Issue 1, Feb. 1995, Springer-Verlag New York, Inc., Secaucus, NJ, pp. 15-24.
Alfred V. Aho, M. J. Corasick, "Efficient string matching: an aid to bibliographic search," Magazine Communications of the ACM, vol. 18 Issue 6, Jun. 1975, ACM New York, NY, pp. 333-340.
Apple Computer, Inc., "Apple Computer Makes Six Newton Announcements," Apple Inc., Cupertino, CA, News Release, Stanford University Libraries, Cupertino, CA., Mar. 4, 1994, p. 30.
Apple Computer, Inc., "Newton Programmer's Reference for Newton 2.0," Apple Inc., Cupertino, CA, Addison-Wesley Publishing, Cupertino, CA, 1996, pp. 1376.
Christopher Barr, M. Neubarth, "Pen Pals," PC Magazine, vol. 12, No. 17, Oct. 12, 1993, pp. cover page, table of contents and 117-182.
Deborah Barreau, B.A. Nardi, "Finding and reminding: file organization from the desktop," Newsletter ACM SIGCHI, Bulletin, vol. 27 Issue 3, Jul. 1995, ACM, New York, NY, pp. 39-43.
David Benyon, D. Murray, "Developing adaptive systems to fit individual aptitudes," IUI '93 Proceedings of the 1st international conference on Intelligent user interfaces, ACM, New York, NY, 1993, pp. 115-121.
Eric A. Bier, M.C. Stone, K. Fishkin, W. Buxton, T. Baudel, "A taxonomy of see-through tools," CHI '94 Conference companion on Human factors in computing systems, ACM, New York, NY, 1994, pp. 358-364.
Thomas Bonura, J. R. Miller, "Drop Zones: An extension to LiveDoc," Newsletter, ACM SIGCHI Bulletin, vol. 30 Issue 2, Apr. 1998, ACM, New York, NY, pp. 59-63.
Jim Miller, T. Bonura, "From documents to objects: an overview of LiveDoc," Newsletter, ACM, vol. 30 Issue 2, Apr. 1998, ACM, New York, NY, pp. 53-58.
Jeanette Borzo, T. Quinlan, "Word Perfect and Novell Plan to adopt OpenDoc: Apple's compound-document architecture," PC Expo 1993, Info World, vol. 15 issue 27, Jul. 5, 1993, pp. 8.
Helen Casbona, K. Vian, R. West, "User's Guide," NextStep, Jan. 1, 1993, pp. 384.
Daniel T. Chang, "HieNet: a user-centered approach for automatic link generation," HYPERTEXT '93 Proceedings of the fifth ACM conference on Hypertext, ACM, New York, NY, 1993, pp. 145-158.
Doug Clapp, "The Next Bible: Hardware and Software Systems for the Next Computer," Brady Books, NY, 1990, pp. 683.
Philip R. Cohen, A. Cheyer, M. Wang, S.C. Baeg, "An open agent architecture," Readings in agents, Morgan Kaufmann Publishers Inc., San Francisco, CA, 1998, pp. 197-204.
Allen Cypher, "Watch What I Do: Programming by Demonstration," The MIT Press, Cambridge, Massachusetts London, England, 1993, pp. 652.
Allen Cypher, "EAGER: programming repetitive tasks by example," CHI '91 Proceedings of the SIGCHI conference on Human factors in computing systems: Reaching through technology, ACM, New York, NY, 1991, pp. 33-39.
Anind K. Dey, G.D. Abowd, A. Wood, "CyberDesk: a framework for providing self-integrating context-aware services," IUI '98 Proceedings of the 3rd international conference on Intelligent user interfaces, ACM, New York, NY, 1998, pp. 47-54.
Eric Ding, "GNU Emacs," Free Software Foundation Inc., Aug. 15, 1995, Boston, MA, pp. 5.

(56) References Cited

OTHER PUBLICATIONS

Ivor Durham, D.A. Lamb, J.B. Saxe, "Spelling correction in user interfaces," Magazine, Communications of the ACM, vol. 26 Issue 10, Oct. 1983, ACM, New York, NY, pp. 709-710.
Jay Earley, "An efficient context-free parsing algorithm," Magazine, Communications of the ACM—Special 25th Anniversary Issue, vol. 26 Issue 1, Jan. 1983, ACM, New York, NY, pp. 3.
Go Cororation, "PenPoint: Architectural Reference vol. II," Addison-Wesley Publishing Company, Jun. 1992, Foster City, CA, pp. 528.
Go Cororation, "PenPoint: Architectural Reference vol. I," Addison-Wesley Publishing Company, Apr. 1992, Foster City, CA, pp. 645.
R.E. Griswold, J.F. Poage, I.P. Polonsky, "The Snobol4 Programing Language: Second Edition," Prentice Hall Inc., Englewood Cliffs, NJ, May 1970, pp. 256.
Kevin Hughes, "Entering the World-Wide Web: A guide to cyberspace," ACM SIGLINK Newsletter, vol. III, No. I, Mar. 1994, pp. 4-8.
Eric Jackson, D. Appelt, J. Bear, R. Moor, A. Podlozny, "A template matcher for robust NL interpretation," HLT '91 Proceedings of the workshop on Speech and Natural Language, Association for Computational Linguistics Stroudsburg, PA, 1991, pp. 190-194.
Kaare Christian, S. Richter, "The Unix Operating System: Third Edition," John Wiley & Sons Inc., New York, NY, 1994, pp. 541.
Christopher Kennedy, B. Boguraev, "Anaphora in a Wider Context: Tracking Discourse Referents," ECAI 96, 12th European Conference on Artificial Intelligence, John Wiley & Sons, 1996, pp. 582-586.
Erica Kerwien, "Lotus Notes Application Development Handbook," IDG Book Worldwide Inc., Foster City, CA, Dec. 1994, pp. 506.
David Kurlander, S. Feiner, "Interactive constraint-based search and replace," CHI '92 Proceedings of the SIGCHI conference on Human factors in computing systems, ACM, New York, NY, 1992, pp. 609-618.
David Kurlander, E.A. Bier, "Graphical Search and Replace," Computer Graphics, vol. 22 Issue 4, Aug. 1988, Proceedings of SIGGRAPH '88, Atlanta, Georgia, pp. 113-120.
Galt et al., "Aggregating Machine Learning and Rule Based Heuristics for Named Entity Recognition", Language Technologies Research Centre, International Institute of Information Technology, Hyderabad, India, Jan. 2008, pp. 25-31.
Asadi et al., "Pattern-Based Extraction of Addresses from Web Page Content", School of Information Technology & Electrical Engineering, The University of Queensland, Apr. 2008, pp. 407-418.
Srihari et al., "A Hybrid Approach for Named Entity and Sub-Type Tagging", 2000, pp. 247-254.
Li et al., "InfoXtract location normalization: a hybrid approach to geographic references in information extraction", 2003, pp. 39-44.
Yu et al., "Resume Information Extraction with Cascaded Hybrid Model", 2005, pp. 499-506.
Srihari et al., "InfoXtract: A Customizable Intermediate Level Information Extraction Engine", 2003, pp. 51-58.
Tsai et al., "Mencius: A Chinese Named Entity Recognizer Using the Maximum Entropy-based Hybrid Model", The Association for Computational Linguistics and Chinese Language Processing, vol. 9, No. 1, Feb. 2004, pp. 65-82.
De Sitter et al., "Information Extraction via Double Classification", 2003, pp. 66-71.
Abbasi, "Information Extraction Techniques for Postal Address Standardization" 2005, 6 pages.
Chieu et al., "A Maximum Entropy Approach to Information Extraction from Semi-Structured and Free Text", AAAI-02 Proceedings, 2002, pp. 786-791.
Aho et al., "LR Parsing", Computing Surveys, vol. 6, No. 2, Jun. 1974, pp. 99-124.
Cse321, Programming Languages and Compilers, "Lecture #5" Jan. 23, 2006, 46 pages.
Kallmeyer, "Computational Linguistics II: Parsing Bottom-Up Parsing" Dec. 5, 2007, 5 pages.
"Class 20: Shift-Reduce Parsing (1)", Compilers (CS362 2004S), Mar. 5, 2004, 5 pages.
Teitelbaum et al. "Introduction to Compilers" Jan. 26, 2007, 5 pages.
Otto, "Epsilon-Logic is More Expressive than First Order Logic over Finite Structures" 1999, 10 pages.
Hsu et al., "Generating finite-state transducers for semi-structured data extraction from the Web" 1998, pp. 521-538.
Kempe et al., "Extraction and recoding of input-e-cycles in finite state transducers" 2004, pp. 145-158.
Mohri, "Generic £-removal algorithm for weighted automata" 2001, pp. 230-242.
Agrawal et al., "An Efficient Incremental LR Parser for Grammars With Epsilon Productions" 1983, pp. 369-376.
Delmon, "Generic epsilon-removal" Jun. 2007, 17 pages.
Mohri, "Weighted Finite-State Transducer Algorithms. An Overview" 2004, 13 pages.
Kempe, "Factorization of ambiguous finite-state transducers" 2001, pp. 170-181.
Mohri, "Finite-state transducers in language and speech processing" 1997, pp. 269-311.
Hierons, "Testing from a nondeterministic finite state machine using adaptive state counting" 2004, 19 pages.
Piskorski et al., "An intelligent text extraction and navigation system" 2000, 24 pages.
Graehl et al., "Training Tree Transducers" 2004, 8 pages.
Appelt et al., "FASTUS: A finite-state processor for information extraction from real-world text" 1993, 8 pages.
Kempe, "Reduction of intermediate alphabets in finite-state transducer cascades" 2000, pp. 207-215.
Johnston et al., "Finite-state multimodal parsing and understanding" 2000, 7 pages.

\* cited by examiner

| 1 | M |
| 2 | MI |
| 3 | I |

DATA DETECTION OF A CHARACTER SEQUENCE HAVING MULTIPLE POSSIBLE DATA TYPES

RELATED APPLICATION

This application claims the benefit of U.S. Provisional Patent Application No. 61/059,720, filed on Jun. 6, 2008, which is herein incorporated by reference.

FIELD OF THE INVENTION

The present invention relates to the field of processing sequences of characters and, in addition, to detecting data included in such sequences of characters.

BACKGROUND OF THE INVENTION

The processing of sequences of characters to analyze their grammatical structure is well-known, both for analyzing natural languages and computer languages. In the case of natural languages, the sequences of characters are broken down into words, each word forming a part of speech, such as noun, verb, adjective, adverb, preposition and so on. Thus, each word can be allocated a class according to its function in context.

For the processing of computer languages, it is well known to process the sequence of characters in a lexer to break the characters into a sequence of tokens and then to parse the tokens to create some form of internal representation, which can then be used in a compiler or an interpreter.

Such processing has previously been used to analyze sequences of characters to extract useful information from the sequence. For example, techniques have been developed to analyze blocks of text, such as e-mails or other data received by or input to a computer, to extract information such as e-mail addresses, telephone and fax numbers, physical addresses, IP addresses, days, dates, times, names, places and so forth. In one implementation, a so-called data detector routinely analyses incoming e-mails to detect such information. The detected information can then be extracted to update the user's address book or other records.

Conventionally, such data detection is performed using a layered engine as shown in FIG. 1. The engine is embodied in a processor 1 and comprises a lexical analyzer or lexer 10 and a parser 20. The lexer 10 receives as its input a sequence of characters, such as the characters in an e-mail message. Note that the characters are not limited to letters or even numbers, but may include any other characters, such as punctuation.

The lexer 10 stores a vocabulary that allows it to resolve the sequence of characters into a sequence of tokens. Each token comprises a lexeme (analogous to a word) and a token type (which describes its class or function). One token type is provided for each predetermined function. As an example, a simple lexer 10 may include the following vocabulary:

DIGIT:=[0-9] (A digit is a single number from 0 to 9)
NUMBER:=DIGIT+(A number is two or more digits together)
LETTER:=[a-zA-Z] (A letter is an upper or lower case letter from A-Z)
WORD:=LETTER+(A word is two or more letters together)

The lexer 10 would break down the string of characters "There are 2 books and 15 magazines" into the following tokens:

| Lexeme | Token Type |
|---|---|
| THERE | WORD |
| ARE | WORD |
| 2 | DIGIT |
| BOOKS | WORD |
| AND | WORD |
| 15 | NUMBER |
| MAGAZINES | WORD |

The parser 20 receives the sequence of tokens from the lexer 10. The parser 20 includes a grammar, which it uses to analyze the tokens to extract predetermined data. For example, if the engine 1 is intended to detect all quantities, the parser 20's grammar may be that:
QUANTITY:=DIGIT WORD|NUMBER WORD
where "|" indicates "or". Thus, on receiving the sequence of tokens from the lexer 10, the parser 20 will return the quantities "2 books" and "15 magazines".

Commonly, both the lexer 10 and the parser 20 use a decision tree. An example of such a decision tree for a further example of a lexer 10 is shown in FIG. 2. In this case, the lexer 10 includes the following vocabulary:
a:=1 9 [0-9]{2}
b:=1 9 5
where 'a' and 'b' are two token types that the lexer 10 can ascribe to different lexemes. The decision tree in FIG. 2 shows 5 possible states in addition to the start state. As the lexer 10 processes a sequence of characters, it checks the first character in the sequence against the options available at the start state S and proceeds according to the result.

For example, if the lexer 10 is presented with the sequence of characters '1984', it will process the character '1' first. State S only allows the processing to proceed if the first character is '1'. This condition is met so character '1' is consumed and processing proceeds to state 1, where the next character in the sequence ('9') is compared with the available conditions. It should be noted that state 1 is represented using a dotted circle. This is indicative that processing may not end at this state without the branch dying, as will become apparent later.

The only available condition at state 1 is that the next character is '9'. This condition is met, so character '9' is consumed and processing proceeds to 2.

The conditions at state 2 are that processing should proceed to state 3 if the next character is '5', or that it should proceed to state 4 if the next character is any one of 0, 1, 2, 3, 4, 6, 7, 8 or 9. Again, state 2 is represented using a dotted circle and processing may not end at this state.

The next character is '8', which meets the condition for processing to proceed to state 4, which is also represented by a dotted circle. Accordingly, the '8' is consumed and processing continues. Since the next character in the sequence ('4') meets the only available condition from state 4, processing proceeds to state 5.

State 5 is represented by a solid circle, indicating that processing may end there. As shown in FIG. 2, state 5 has the property of reducing the consumed characters to a token of token type 'a'. In our example, since all the characters have been used up and there are no more characters, processing ends at state 5 and the consumed sequence of characters is reduced to a token comprising the lexeme '1984' and the token type 'a'.

Similarly, the lexer 10 in FIG. 2 would process the sequence of characters '195' as set out below. First, characters '1' and '9' would be consumed in the same manner as described above. However, at state 2, the next character is '5'. This meets the condition for proceeding to state 3, which has the property of reducing the consumed characters to a token of token type 'b'. In this case, since all the characters have been used up and there are no more characters, processing ends at state 3 and the consumed sequence of characters is reduced to a token comprising the lexeme '1985' and the token type 'b'.

By contrast, the lexer 10 in FIG. 2 would process the sequence of characters '1955' as set out below. First, characters '1', '9' and '5' would be consumed in the same manner as described above. However, at state 3, not all the characters have been used up. Rather, a further '5' remains, which meets the condition for proceeding to state 5, where the consumed sequence of characters is reduced to a token comprising the lexeme '1955' and the token type 'a'.

Now consider a parser 20 including the following grammar:

A:=a|ε

E:=Acd|ce where A and E are predetermined grammatical or data categories that we wish to detect; a, c, d and e are various token types; and ε represents a "nothing". Thus, the parser 20 outputs a category A if either a lexeme with token type 'a' is presented or an unmatched token type is presented. Similarly, the parser 20 outputs an E when it processes Acd or ce. However, since the parser 20 outputs an A when presented with a token type 'a' or with a nothing, by substituting the equation for A into the equation for E, it can be seen that in practice the parser 20 outputs an E when it processes any of acd, cd and ce. A decision tree for this grammar is shown in FIG. 3 and includes start state S, finish state F, and processing states 0-5. As the parser 20 processes a sequence of tokens, it checks the first token in the sequence against the options available at the start state S and proceeds according to the result.

For example, if the parser 20 is presented with the sequence of tokens comprising a token having token type c, followed by a token having token type e, the parser 20 must process the token-type sequence 'ce'. The following table represents the processing that takes place.

| Current state | Sequence to process | Previous states |
| --- | --- | --- |
| S | ce | |
| 0 | e | S |
| 1 | | S, 0 |
| S | E | |
| F | | S |

Put simply, proceeding from the start state S, the parser 20 consumes a 'c' and proceeds to state 0, and then consumes an 'e' and proceeds to state 1. State 1 allows processing to finish with the reduction to go back two states and replace the consumed letters by an 'E'. Processing then returns to the start state S, where the E is processed. The E is consumed as processing proceeds to the finish state F. Thus, the token type sequence c followed by e is parsed as having the grammatical or data type E.

Similarly, the token sequence 'acd' is processed using the parsing tree shown in FIG. 3 as shown in the following table:

| Current state | Sequence to process | Previous states |
| --- | --- | --- |
| S | acd | |
| 5 | cd | S |
| S | Acd | |
| 2 | cd | S |
| 3 | d | S, 2 |
| 4 | | S, 2, 3 |
| S | E | |
| F | | S |

Here, the first token type to be parsed is 'a'. Starting at start state S, the 'a' is consumed and processing proceeds to state 5, which has the reduction to go back one state and replace the consumed items with an 'A'. Thus, the sequence is changed from 'acd' to 'Acd' and processing returns to state S, where the A is consumed and processing proceeds to state 2. Next, as processing proceeds along the middle branch of the tree to states 3 and 4, the c and the d are consumed. At state 4, the consumed sequence Acd is replaced by an E and processing returns to state S, where the E is processed. The E is consumed as processing proceeds to the finish state F. Thus, the token type sequence a followed by c followed by d is also parsed as having the grammatical or data type E.

Similarly, the token sequence 'cd' is processed using the parsing tree shown in FIG. 3 as shown in the following table:

| Current state | Sequence to process | Previous states |
| --- | --- | --- |
| S | cd | |
| S | Acd | |
| 2 | cd | S |
| 3 | d | S, 2 |
| 4 | | S, 2, 3 |
| S | E | |
| F | | S |

Here, the first token type to be parsed is 'c'. Starting at start state S, the 'c' is consumed and processing proceeds to state 0. The next token type to be parsed is a 'd', but state 0 does not provide an option for proceeding with this token type. Moreover, state 0 is represented by a dotted circle, indicating that processing cannot finish at that state. Accordingly, this branch is a "dead" branch and processing reverts with the entire sequence intact to the start state S. This state is provided with the reduction that an 'A' must be placed at the front of the sequence. Thus, the sequence to be parsed is now 'Acd'. This is the same sequence as is generated during processing of the sequence acd above, and processing proceeds in exactly the same way. Thus, the token sequence c followed by d is also parsed as having the grammatical or data type E.

In this way, it can be seen that the parsing tree shown in FIG. 3 is consistent with the grammar:

A:=a|ε

E:=Acd|ce

The foregoing is a simple explanation of the basic functionality of lexers 10 and parsers 20. This functionality can be adapted to detect predetermined types of data from a sequence of characters, for example in an e-mail or a block of text. Imagine that it is intended to detect either a time or a bug identification code in a block of text. In the following example, the format of a time to be detected is that it is always one of AM, PM, A or P followed by two digits, whereas the format of a bug identification code to be detected is always two letters followed by three digits. Accordingly, the lexer 10 may be provided with the vocabulary:

INITIALS:=[A-Z]{2} (INITIALS is any two letters together)
MERIDIAN:=(A|P) M? (MERIDIAN is the letter A or the letter P, optionally followed by the letter M)
DIGIT:=[0-9] (DIGIT is any character from 0 to 9)

whereas the parser 20 may be provided with the grammar:

BUG_ID:=INITIALS DIGIT{3} (INITIALS token followed by 3 DIGIT tokens)
TIME:=MERIDIAN DIGIT{2} (MERIDIAN token followed by 2 DIGIT tokens)

In more detail, the lexer 10 will output a sequence of a letter from A to Z followed by another letter from A to Z as a token having a lexeme of the two letters and having the token type INITIALS. It will also output the letters AM and PM as a token having the token type MERIDIAN. In this notation '?' indicates that the preceding character(s) may or may not be present. Thus, the lexer 10 will also output the letter A alone, or the letter P alone as a token having the token type MERIDIAN.

FIG. 4 shows a decision tree of the lexer 10 and FIG. 5 shows a decision tree of the parser 20. As will be clear from following the decision tree shown in FIG. 4, the lexer 10 will process the sequence of characters AM02 and output four tokens. The first is a token having the lexeme AM and the token type INITIALS, while the second is a token also having the lexeme AM, but this time the token type MERIDIAN. This is consistent with the vocabulary used by the lexer 10, since the letters AM can be either INITIALS or a MERIDIAN. The third and fourth tokens have the lexemes '0' and '2' respectively and each has the token type DIGIT. This sequence of four tokens is then operated on by the parser 20.

As noted above, the first two tokens both have the lexeme AM and the respective token types INITIALS and MERIDIAN. Accordingly, when the character string AM occurs, two sequences of tokens are processed by the parser 20 using the decision tree shown in FIG. 5. One sequence of tokens meets the first condition of the starting state, while the other sequence of tokens meets the other condition. Accordingly both conditions or branches are investigated, either in turn or in parallel.

In the case of the left-hand INITIALS branch, the processing proceeds to state 1 and then states 2 and 3, since the next two tokens have the token type DIGIT. However, the parser 20 then runs out of tokens to parse and so cannot proceed to state 4. Since state 3 is represented by a dotted circle, processing cannot end there and so a BUG_ID is not detected.

In the case of the right-hand MERIDIAN branch, the processing proceeds to state 5 and then states 6 and 7, since the next two tokens have the token type DIGIT. At state 7 it is determined that the sequence of tokens MERIDIAN followed by DIGIT and DIGIT represents TIME. In this way, a time is detected.

In some cases, in real life situations it is possible to detect two different types of information (eg TIME and BUG_IDENTIFICATION) from the same sequence of characters, for example where the results are overlapping. For instance in the BUG_ID/TIME example, consider the character sequences "AM12" in "AM123". Within "AM123" we could recognize both a time (characters 1 to 4), and a bug identification code (characters 1 to 5). In such an event, it is common practice to provide an additional filter to determine which of the two detected types of information is more likely to be the correct one. One commonly-used heuristic that has proven efficient is to keep only the longest result—in this case, the bug identification code.

Such a methodology can be applied to many different types of grammar and data structures and has previously been found to be particularly successful in extracting predetermined types of data from sequences of characters. However, in view of the increasing calls on the processors of user and server computers to carry out numerous tasks (including data detection), combined with the increasing volume of information that needs to be scanned and the increasingly complex and numerous types of information it is desired to detect, the conventional methodology typically takes a long time to detect predetermined types of data.

SUMMARY OF THE DESCRIPTION

Methods, systems and machine-readable storage media for processing a sequence of characters are described. In one embodiment, a method for processing a sequence of characters includes converting the sequence of characters into a sequence of tokens, each token comprising a lexeme and one of a plurality of token types, each of the plurality of token types relating to at least one of a plurality of predetermined functions, and at least one of the token types relates to multiple functions of the plurality of predetermined functions, such as functions that describe functions of the lexeme in the context of the sequence of characters. The method may further include parsing the tokens to detect predetermined types of data in the sequence of characters and these predetermined types of data may include at least one of a physical address (e.g. street address), an IP address, an email address, a time, a day, a date, or other contact information. Other methods are also described, and systems and machine-readable storage media which perform these methods are also described.

BRIEF DESCRIPTION OF THE DRAWINGS

Embodiments of the present invention will now be described by way of further example only and with reference to the accompanying drawings, in which.

DETAILED DESCRIPTION

Figure 1:
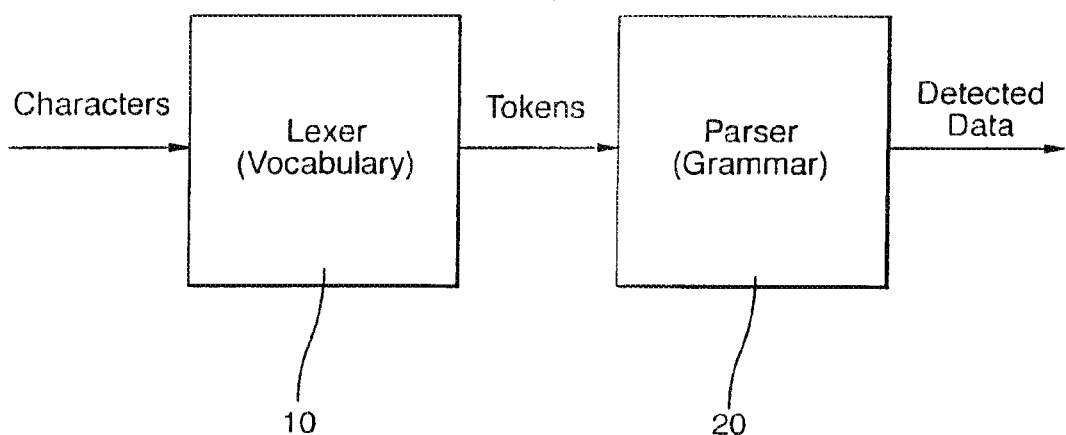
FIG. 1 is a schematic representation of a parsing apparatus.
Figure 2:
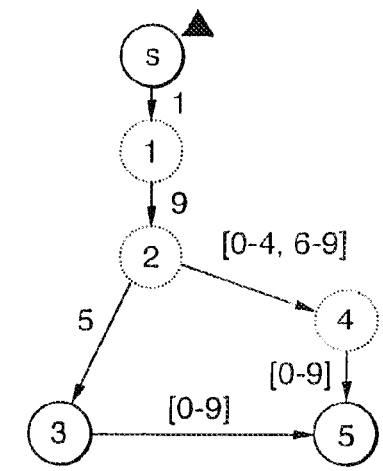
FIG. 2 shows a decision tree of a lexer 10 according to the known art.
Figure 3:
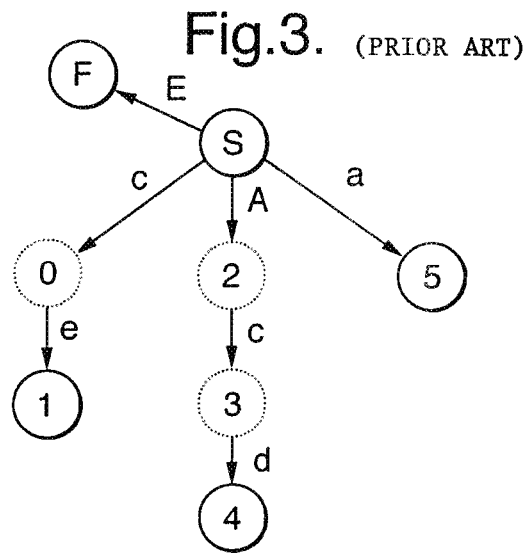
FIG. 3 shows a decision tree of a parser 20 according to the known art.
Figure 4:
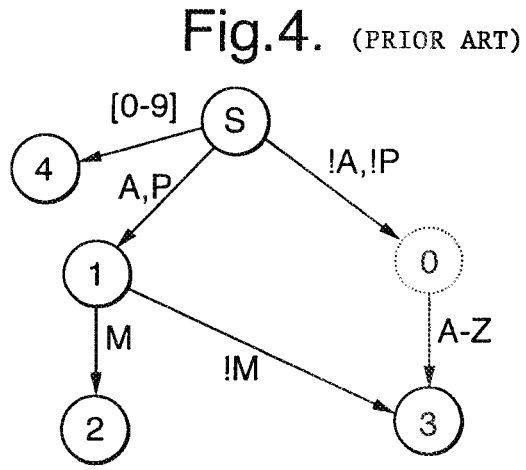
FIG. 4 shows a decision tree of another lexer 10 according to the known art.
Figure 5:
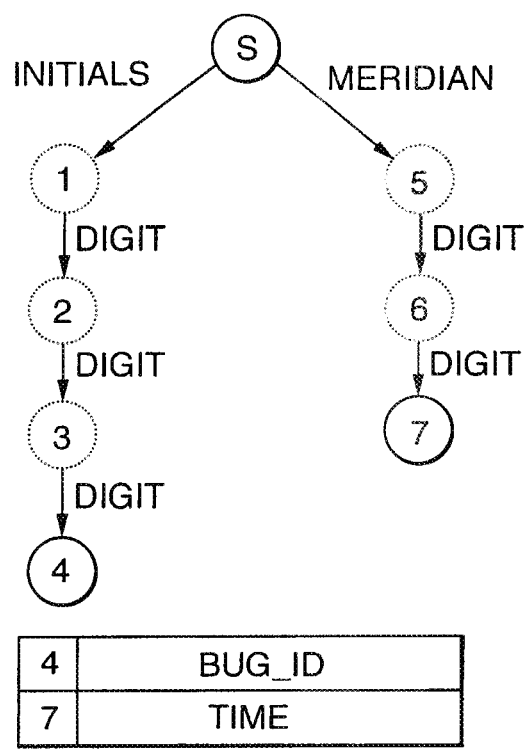
FIG. 5 shows a decision tree of another parser 20 according to the known art.

Embodiments of the present invention is generally related to lexing and parsing sequences of characters. In particular, some embodiments of the present invention are related to improving the efficiency of some existing lexer and parser. For instance, referring to the foregoing example of processing the character sequence "AM02", the procession down the right-hand INITIALS branch in FIG. 5 represents wasted processing since the branch effectively dies once it is recognized that it is not possible to proceed past state 3. Of itself, such an isolated example is not problematic. However, in real life applications, the number of different token types that the lexer 10 can ascribe to the same lexeme (character string) can be large. For example, in the phrase "Let's meet at 8.30", the character '8' could be output as 10 tokens each having the lexeme '8' and a respective one of the token types:
DIGIT
NUMBER
IP_BLOCK
PHONE_BLOCK
HOURS
MINUTES
STREET_NUMBER
DAY_NUMBER
MONTH_NUMBER
YEAR_NUMBER Thus, the parser 20 must process the lexeme as ten different tokens. Similarly, the characters '30' could be output as seven tokens each having the lexeme '30' and a respective one of the token types:
NUMBER
IP_BLOCK
PHONE_BLOCK
MINUTES
STREET_NUMBER
DAY_NUMBER
YEAR_NUMBER Consequently, the parser 20 has to process the second lexeme as seven different tokens according to the conventional approach. Thus, using the grammar TIME:=HOURS MINUTES, in order to detect the time "8.30" from the sequence of characters, the parser 20 must investigate a branch for each of the token types for the first lexeme together with each of the token types of the second lexeme—a total of 70 (10×7) branches. However, in order to detect the time, only one branch will be correct and 69 of the branches will be dying branches. Further, when it is recognized that some types of data to be detected may comprise three or more token types, it becomes apparent not only that many branches need to be provided, but more importantly that processing through the parsing tree will throw up a huge number of dying branches. These dying branches represent wasted processing time.

Although the lexer 10 acts entirely as intended and outputs precisely the correct tokens, the possibility of ascribing a large number of token types to each lexeme can be detrimental to the efficiency of the parser 20. Moreover, it is possible to take advantage of the fact that the lexer 10 and the parser 20 are specifically designed to operate together and can be adapted to each other's requirements. For example, unlike prior art lexers, it is not necessary for the lexer 10 to make a final decision as to the token type or token types of any particular lexeme.

Figure 6:
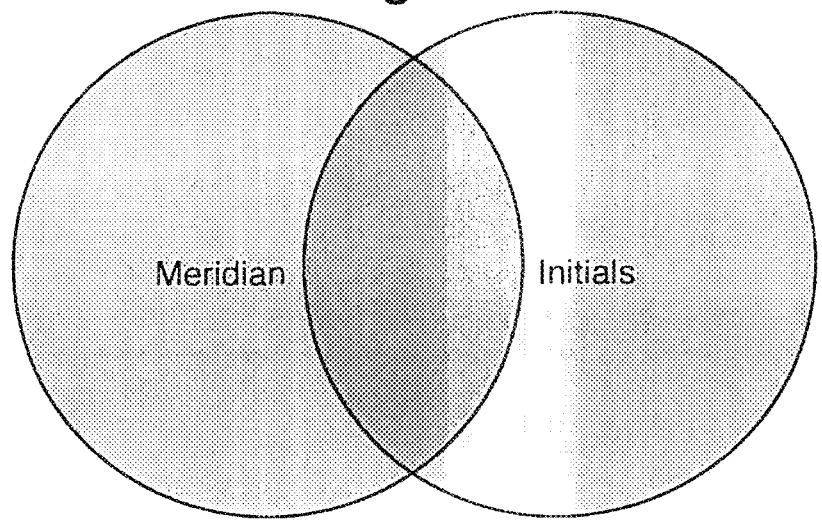
FIG. 6 represents the token space used in the known art.

Specifically, recalling the grammar
INITIALS:=[A-Z]{2}
MERIDIAN:=(A|P) M?
DIGIT:=[0-9]
BUG_ID:=INITIALS DIGIT{3}
TIME:=MERIDIAN DIGIT{2}
in the foregoing example, the lexer 10 was fed the characters 'AM' and output two tokens each having the lexeme AM and a respective one of the token types INITIALS and MERIDIAN. Effectively, the token types can be represented in a Venn diagram, with each token type representing a circle, as shown in FIG. 6. In this example, the token type INITIALS intersects with the token type MERIDIAN and, due to this intersection, to the conventional approach ascribes to a lexeme falling in this intersection both token types. This allows the parser 20 to check whether the function of the lexeme is to act as the class INITIALS or the class MERIDIAN.

However, in at least certain embodiments of the present invention, it is recognized that the lexer 10 and parser 20 can be less formal and that the token types need not be allocated on a one-to-one basis with the functions that the lexemes can carry out. Specifically, the lexer 10 may not have to decide which particular function each lexeme has in order for the parser 20 to detect data. Rather, in at least certain embodiments of the present invention, a third "mixed" token type is used instead to indicate that the lexeme may have any one of a plurality of different functions.

Figure 7:
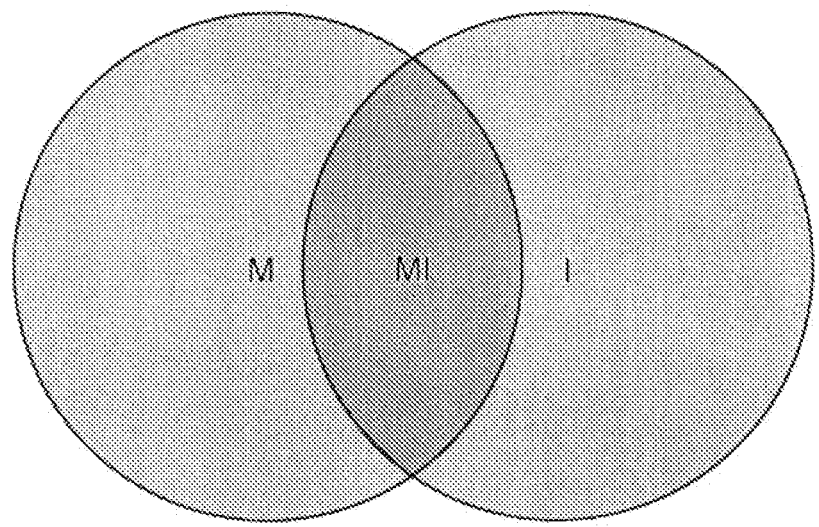
FIG. 7 represents the token space using the present invention.

Thus, in the present example, as shown in FIG. 7, three token types are provided—M, MI and I. The token type M means the lexeme has the function of MERIDIAN (and not INITIALS); the token type I means the lexeme has the function of INITIALS (and not MERIDIAN); and the token type MI means that the lexeme can have the function of either INITIALS or MERIDIAN.

Accordingly, when confronted with a lexeme such as AM, which may have either the function INITIALS or the function MERIDIAN, instead of ascribing both token types INITIALS and MERIDIAN to the lexeme, the lexer 10 ascribes the lexeme AM with the token type MI, meaning that it can have either the function INITIALS or the function MERIDIAN and outputs a single token, according to some embodiments of the present invention. Using a different terminology, a lexeme/token having such a "mixed" token type may be called a "proto-lexeme." Such a "mixed token type" may similarly be called a "proto-token type."

With this ability to output proto-lexemes having mixed token types, it also becomes possible for the lexer 10 to further designate other lexemes as definitively having a single function. Such lexemes and single-function token types may also be termed proto-lexemes and proto-token types.

Accordingly, the prefix "proto" is indicative of a token, token type or lexeme output by a lexer 10 according to the present invention.

Thus, the single character 'A' by itself can be designated as a proto-lexeme having proto-token type M (MERIDIAN and not INITIALS), and a sequence such as 'PQ' can be output as a lexeme having proto-token type I (INITIALS and not MERIDIAN).

Accordingly, it will be apparent that the lexer 10 is able to ascribe a greater number of types to a lexeme—in this example, three proto-token types, instead of two normal token types. However, in this example, it ascribes only a single proto-token type to a lexeme, whereas a prior art lexer could ascribe multiple, different token types to the same lexeme.

Figure 8:
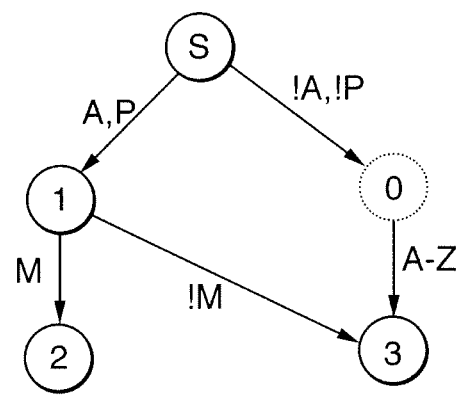
FIG. 8 shows a decision tree of a lexer 10 according to the present invention.

Continuing with this example, a decision tree for a corresponding lexer 10 of the present invention is shown in FIG. 8. At the start state S, it is determined whether the first character is an 'A' or a 'P' and, if it is, processing proceeds to state 1. If there are no more letters, processing is finished at that state and the sequence is determined to form a token having lexeme A or P and token type M—that is, the lexeme has the MERIDIAN function without a possibility of having the INITIALS function. However, if there are more characters in the sequence and the next character in the sequence is an 'M', processing proceeds to state 2, where the sequence is determined to form a token having lexeme AM or PM and token type MI—that is, a mixed token type in which the lexeme can have either the MERIDIAN or INITIALS functions.

The condition !M at state 1 means "not M". Accordingly, if there is different character after A or P, processing proceeds to state 3 and the sequence is determined to form a token having lexeme A or P followed by another letter and token type I—that is, the lexeme has the INITIALS function without a possibility of having the MERIDIAN function. It will be evident from the right-hand branch in the figure how the lexer 10 will output other sequences of two letter words as a token having token type I.

In each case, the lexemes/tokens may be termed proto-lexemes.

Figure 9:
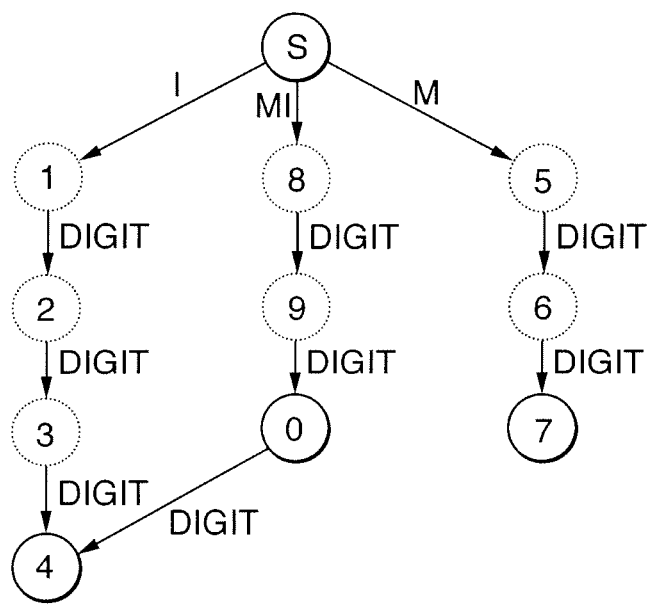
FIG. 9 shows a decision tree of a parser 20 according to the present invention.

In some embodiments, the parser 20 is tailored to act in tandem with the lexer 10 to handle such proto-lexemes. An example of a modified decision tree for the parser 20 in this example is shown in FIG. 9. In particular, an additional branch is provided at the start state S to cope with the mixed token type MI.

If, for example, the sequence A02 is entered into the lexer 10, it forwards to the parser 20 three tokens having the respective token types M, DIGIT, DIGIT. Operating on this, the parser 20 follows the right-hand branch of the decision tree in FIG. 9 following the route S,5,6,7 and detects A02 as a time.

If the sequence AQ023 is entered into the lexer 10, it forwards to the parser 20 four tokens having the respective token types I, DIGIT, DIGIT, DIGIT. Operating on this, the parser 20 follows the left-hand branch of the decision tree in FIG. 9 following the route S,1,2,3,4 and detects AQ023 as a bug identification code.

However, if the sequence AM02 is entered into the lexer 10, it forwards to the parser 20 three tokens having the respective token types MI, DIGIT, DIGIT. Operating on this, the parser 20 follows the middle branch of the decision tree in FIG. 9 following the route S,8,9,0. At state 0, there are no more tokens in the sequence matching the available condition so the reduction for state 0 is used. Accordingly, AM02 is detected as a time.

Moreover, if the sequence AM023 is entered into the lexer 10, it forwards to the parser 20 four tokens having the respective token types MI, DIGIT, DIGIT, DIGIT. Operating on this, the parser 20 again follows the middle branch of the decision tree in FIG. 9 following the route S,8,9,0. At state 0, a further token in the sequence matches the available condition so the processing proceeds to state 4. Accordingly, AM023 is detected as a bug identification code.

By contrast, if the sequence AQ02 is entered into the lexer 10, it forwards to the parser 20 three tokens having the respective token types I, DIGIT, DIGIT. Operating on this, the parser 20 follows the left-hand branch of the decision tree in FIG. 9 following the route S,1,2,3. At state 3, there are no more tokens in the sequence matching the available condition. However, as state 3 is represented by a dotted circle, processing cannot finish at this state and neither a time nor a bug identification code is detected.

As will be clear from the foregoing simple example, a branch from the start state S is provided for the mixed token type. Accordingly, irrespective of whether the lexeme is a normal lexeme or proto-lexeme, it can be processed using a single path. Effectively, there is only one path processing a proto-lexeme and it is no longer necessary to process multiple paths for a single lexeme. Thus, the parser 20 does not process any dying branches for the proto-lexeme. In this way, sequences of characters such as e-mails can be scanned considerably more quickly.

It can also be noted that while the lexer 10 does not make any definitive decision on whether the lexeme AM has the function MERIDIAN or INITIALS, no such decision is made by the parser 20 either. Instead, it is enough to determine whether the lexeme has a mixed token type in order to detect whether a time or a bug identification code is present.

In many real life applications, the number of different token types that the prior art lexer 10 can ascribe to the same lexeme can be large. For example, in the phrase "Let's meet at 8.30", the character '8' was output as ten tokens each having the lexeme '8' and a respective one of the 10 token types:
DIGIT
NUMBER
IP_BLOCK
PHONE_BLOCK
HOURS
MINUTES
STREET_NUMBER
DAY_NUMBER
MONTH_NUMBER
YEAR_NUMBER Similarly, the characters '30' were output as seven tokens each having the lexeme '30' and a respective one of the seven token types:
NUMBER
IP_BLOCK
PHONE_BLOCK
MINUTES
STREET_NUMBER
DAY_NUMBER
YEAR_NUMBER However, in the present invention, a token space similar to that illustrated in FIG. 7 could be constructed. The token type for each lexeme could be a proto-token type that represents a single function exclusively, such as PROTO DIGIT, or a mixed proto-token type, which represents that the lexeme can have two or more functions. For example, one mixed proto-token type for the character '8' could indicate that it has either a DIGIT or NUMBER function; another mixed proto-token type could indicate that it has a DIGIT, NUMBER, HOURS or MINUTES function; and another mixed proto-token type could even indicate that it has any one of the ten possible functions. The precise proto-token types available will depend on the various conjunctions of the sets in a token space diagram similar to the Venn diagram shown in FIG. 7.

Thus, instead of providing the parser 20 with 17 (10+7) tokens to parse in 70 (10×7) combinations, as in the prior art, the lexer 10 of the present invention would output two proto-lexemes each with one proto-token type. As a result, the amount of work needed to be done by the parser 20 is dramatically reduced and hence, the speed of detecting data in a block of text is significantly increased. Indeed, in many real life implementations, the speed of data detection has been more than doubled using some embodiments of the present invention.

Note that that some embodiments of the present invention require an increased complexity in the vocabulary of the lexer 10 and the grammar of the parser 20, with a consequent increase in storage capacity required to store them. However, it has been found that, in some embodiments, the increase in storage capacity required is approximately only 25% starting from a requirement for 3.6 MB for a system according to the prior art in order to achieve a more than two fold increase in scanning speed. In general, the greater the number of patterns in the system, the smaller the increase in proportional terms.

In some embodiments, the lexer 10 ascribes to all tokens a proto-token type—that is, a token type indicating that the lexeme falls in a single category of data, or one of a plurality of categories of data. However, the present invention may also be used in a mixed form with the prior art in some embodiments. That is, a lexer 10 may ascribe a proto-token type to most, only a few or even only one of the tokens it outputs. In this case, the other tokens may be processed in the same way as the prior art—that is, more than one token type can be ascribed to the same lexeme. In such cases, the speed of processing may be reduced but the storage requirements for the lexer 10 and parser 20 may also be reduced.

Moreover, in this case it would be necessary to set up a parser that would accept both some "lexemes" and some "proto-lexemes" as an input. However, this would have to be done carefully: one part of the token space Venn diagram would be converted to a proto-lexeme partitioning, while the other part would remain unchanged. Therefore, some strings would be lexemized, while some would be proto-lexemized.

Some embodiments of the present invention may also be used in a mixed form in which two or more proto-token types are ascribed to the same lexeme. In this case, it would be possible, for example, to ascribe both a mixed proto-token type such as
DIGIT, IP_BLOCK, HOURS, MINUTES
and another mixed proto-token type such as
DIGIT, PHONE-BLOCK, STREET-NUMBER, DAY-NUMBER
to the same lexeme, rather than the single proto-token type
DIGIT, IP_BLOCK, HOURS, MINUTES, PHONE-BLOCK, STREET-NUMBER, DAY-NUMBER Such an arrangement takes advantage of the above concept of reducing dying branches, but reduces the complexity of the lexer 10 and parser 20 and reduces the requirements for storage space.

Embodiments of the present invention have a wide variety of applications. For example, it may be used in scanning e-mails and blocks of text, such as those created in word processing packages. Moreover, it can be used in any application where sequences of characters are processed, such as in compilers and interpreters. Embodiments of the present invention may be implemented using any suitable apparatus. Such an apparatus may include, but is not limited, to data processing machines and devices such as laptop or notebook computers, other user and server computers, and mobile communications devices, such as mobile telephones, personal digital assistants and so forth.

Figure 10:
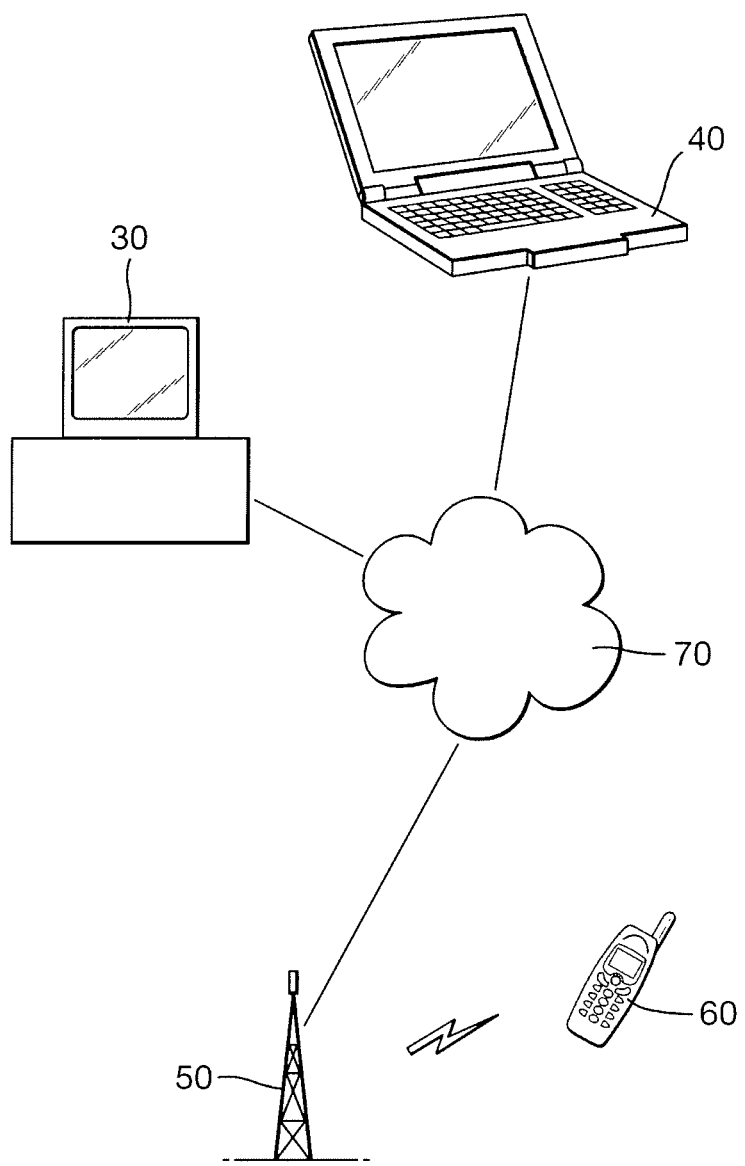
FIG. 10 shows a system in the present invention.

As an example, FIG. 10 shows an arrangement comprising a user computer 30, a notebook computer 40, and a cell phone 60, where one, some or all devices may have a processor 1 adapted to operate in accordance with the present invention. In the present example, at least the notebook computer 40 and the cell phone 60 have such a processor 1. A first user may compose a message and send it by e-mail to a second user. The second user may retrieve the message over the Internet 70 using his notebook computer 40. Upon retrieval of the message, an application embodying one embodiment of the present invention may automatically scan the message to detect whether it includes predetermined data, such as a time, a date, a name, an address and so forth. On detection of a time and a date, the application may notify the second user and provide him with the option of updating his calendar. Similarly, on detection of names, addresses, phone numbers and so forth, the application may notify the second user and provide him with the option of updating his address book. In addition, the second user may retrieve the message using his mobile phone 60 via the Internet 70 and a telecommunications base station 50. Again, an application embodying the present invention may detect predetermined data and provide the option of updating the user's records with the detected data.

It is also conceived that the present invention may be embodied using two or more different devices in some embodiments. For example, one device could carry out the lexing function and the other the parsing function.

The present invention may also be used to extract data included in mobile phone messages, such as SMS text messages and MMS messages, in some embodiments.

The present invention may also be embodied in software causing a data processing device to carry out the invention, as well as in computer-readable media on which such software is stored. Moreover, the present invention may be embodied in dedicated hardware or general-purpose hardware.

Some embodiments of the present invention can relate to an apparatus for performing one or more of the operations described herein. This apparatus may be specially constructed for the required purposes, or it may comprise a general-purpose computer selectively activated or reconfigured by a computer program stored in the computer. Such a computer program may be stored in a machine (e.g. computer) readable storage medium, such as, but is not limited to, any type of disk including floppy disks, optical disks, CDROMs, and magnetic or optical disks, read only memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

Figure 11:
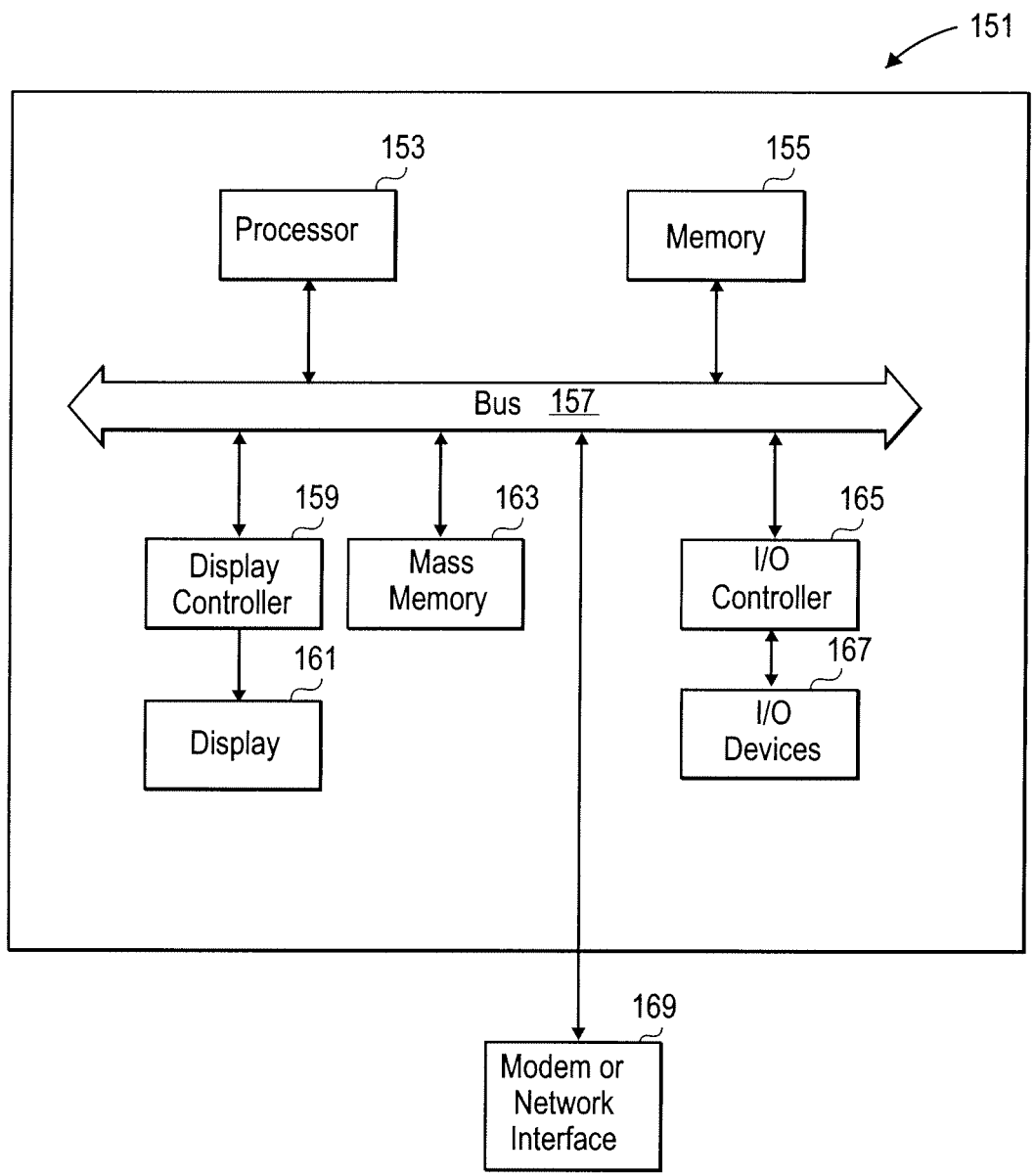
FIG. 11 shows one embodiment of a computer system.

FIG. 11 shows one example of a data processing system, such as a computer system, which may be used with the present invention. Note that while this figure illustrates various components of a data processing system, it is not intended to represent any particular architecture or manner of interconnecting the components as such details are not germane to the present invention. It will also be appreciated that network computers, personal digital assistants (PDAs), cellular telephones, handheld computers, special purpose computers, entertainment systems and other data processing systems and consumer electronic devices which have fewer components or perhaps more components may also be used with the present invention. The system of this figure may, for example, be a Macintosh computer from Apple, Inc.

In some embodiments, the computer system 151 may be used as a server computer system or as a client computer system or as a web server computer system. It will be appreciated that such a computer system may be used to perform many of the functions of an Internet service provider, such as ISP 105. The computer system 151 interfaces to external systems through a modem or network interface 169. It will be appreciated that the modem or network interface 169 may be considered part of the computer system 151. This network interface 169 may be an analog modem, an ISDN modem, a cable modem, a token ring interface, a satellite transmission interface (e.g. "Direct PC"), or other interfaces for coupling a digital processing system to other digital processing systems. The computer system 151 includes a processor 153 which may be a conventional microprocessor, such as a Motorola PowerPC microprocessor or an Intel Pentium microprocessor. Memory 155 is coupled to the processor 153 by the bus 157. Memory 155 may be dynamic random access memory (DRAM) and may also include static RAM (SRAM). The bus 157 couples the processor 153 to the memory 155 and also to mass memory 163 and to display controller 159 and to the I/O (input/output) controller 165. Display controller 159 controls in the conventional manner a display on the display device 161 which may be a CRT or a liquid crystal display device. The input/output devices 169 may include a keyboard, disk drives, printers, a scanner, a digital camera, and other input and output devices, including a mouse or other pointing device. The display controller 159 and the I/O controller 165 may be implemented with conventional well known technology. The mass memory 163 is often a magnetic hard disk, an optical disk, or another form of storage for large amounts of data. Some of this data is often written, by a direct memory access process, into memory 155 during execution of software in the computer system 151. It will be appreciated that the computer system 151 is one example of many possible computer systems, which have different architectures. For example, Macintosh or Wintel systems often have multiple busses, one of which may be considered to be a peripheral bus. Network computers may also be considered to be a computer system, which may be used with the present invention. Network computers may not include a hard disk or other mass storage, and the executable programs are loaded from a network connection into the memory 155 for execution by the processor 153. A Web TV system, which is known in the art, may be considered to be a computer system according to the present invention, but it may not include certain features shown in FIG. 11, such as certain input or output devices. A cell phone having a suitable display and a processor and memory may also be considered to be a digital processing system or a computer system, which may be used with the present invention. A typical computer system will usually include at least a processor, memory, and a bus coupling the memory to the processor. It will also be appreciated that the computer system 151 is typically controlled by an operating system, which includes a file management system, such as a disk operating system, which is part of the operating system.

A machine-readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; electrical, optical, or other form of storage systems.

It will be apparent from this description that aspects of the inventions may be embodied, at least in part, in software. That is, the techniques may be carried out in a computer system or other data processing system in response to its processor or processing system executing sequences of instructions contained in a memory, such as RAM, etc. In various embodiments, hardwired circuitry may be used in combination with the software instructions to implement the present inventions. Thus, the techniques are not limited to any specific combination of hardware circuitry and software, nor to any particular source for the instructions executed by the data processing systems.

The foregoing description has been given by way of example only and it will be appreciated by a person skilled in the art that modifications can be made without departing from the spirit and scope of the present invention.

The invention claimed is:

1. A method to process a sequence of characters, the method comprising:
   receiving the sequence of characters;
   converting, by a lexer embodied in a processor, the sequence of characters into a sequence of tokens, each token comprising a lexeme and a token type,
      wherein each lexeme comprises one or more of the sequence of characters,
      wherein each token type describes at least one of a plurality of predetermined classes ascribed to lexemes by the lexer, and
      wherein the conversion of characters into tokens includes ascribing multiple, different predetermined classes to a single token using one token type, wherein the lexeme for the single token may function as any one of the multiple, different predetermined classes ascribed to the single token; and
   analyzing, by a parser embodied in the processor, the sequence of tokens to detect data types within the sequence of characters based upon the token types of the sequence of tokens, including the token type ascribing the multiple predetermined classes to the single token.

2. A method according to claim 1, wherein at least one said token type indicates that a lexeme is associated with a single one of said predetermined classes.

3. A method according to claim 1, wherein one of the predetermined classes describes one or more possible data types for the lexeme in a context of the sequence of characters.

4. A method according to claim 1, wherein a data type corresponds to a predetermined combination of said predetermined classes.

5. A method according to claim 1, wherein the data types include at least one of a physical address, an IP address, an e-mail address, a time, a day, a date, and a contact number.

6. A method according to claim 1, wherein the analyzing the sequence of tokens comprises providing a single parsing path in a decision tree for each token type, including the token type ascribing the multiple predetermined classes to the single token.

7. A method of processing data, comprising:
   receiving, by a parser embodied in the processor, a sequence of tokens, each token converted by a lexer from a sequence of characters and comprising a lexeme and a token type,
      wherein each lexeme comprises one or more of the sequence of characters,
      wherein each token type describes at least one of a plurality of predetermined classes ascribed to lexemes by the lexer, and,
      wherein the conversion of characters into tokens includes ascribing multiple, different predetermined classes to a single token using one token type, wherein the lexeme for the single token may function as any one of the multiple, different predetermined classes ascribed to the single token; and
   analyzing, by the parser, the sequence of tokens to detect the data types within the sequence of characters based upon the token types of the sequence of tokens, including the token type ascribing the multiple predetermined classes to the single token.

8. A method according to claim 7, wherein the analyzing the sequence of tokens comprises providing a single path for each token type, including the token type ascribing the multiple predetermined classes to the single token.

9. An apparatus to detect predetermined data in a sequence of characters, the apparatus comprising:
   an interface to receive the sequence of characters; and
   a processing device coupled to the interface, the processing device implementing a lexer and a parser,
   the lexer to convert the sequence of characters into a sequence of tokens, each token comprising a lexeme and a token type,
      wherein each lexeme comprises one or more of the sequence of characters,
      wherein each token type describes at least one of a plurality of predetermined classes that correspond to data types,
      wherein the conversion of characters into tokens includes ascribing multiple, different predetermined classes to a single token using one token, wherein the lexeme for the single token may function as any one of the multiple, different predetermined classes ascribed to the single token; and the parser to analyze the sequence of tokens to detect data types within the sequence of characters based upon the token types of the sequence of tokens, including the token type ascribing the multiple predetermined classes to the single token.

10. An apparatus according to claim 9, wherein each token type indicates that a corresponding lexeme is associated with either a single predetermined class or a combination of more than one predetermined class.

11. An apparatus according to claim 9, wherein one of the predetermined classes describes one or more possible data types for the lexeme in a context of the sequence of characters.

12. An apparatus according to claim 9, wherein the data types include at least one of a physical address, an IP address, an e-mail address, a time, a day, a date, and a contact number.

13. An apparatus according to claim 9, wherein the analyzing the sequence of tokens comprises a decision tree having a single parsing path for each token type, including the token type ascribing the multiple predetermined classes to the single token.

14. A non-transitory machine-readable storage medium storing executable program instructions, which, when executed, cause a data processing system to process a sequence of characters by:

receiving the sequence of characters;

converting, by a lexer, the sequence of characters into a sequence of tokens, each token comprising a lexeme and a token type, wherein each lexeme comprises one or more of the sequence of characters, wherein each token type describes at least one of a plurality of predetermined classes ascribed to lexemes by the lexer, and wherein the conversion of characters into tokens includes ascribing multiple, different predetermined classes to a single token using one token type, wherein the lexeme for the single token may function as any one of the multiple, different predetermined classes ascribed to the single token; and analyzing, by a parser embodied in the processor, the sequence of tokens to detect data types within the sequence of characters based upon the token types of the sequence of tokens, including the token type ascribing the multiple predetermined classes to the single token.

15. An apparatus to detect predetermined data in a sequence of characters, the apparatus comprising:

an interface to receive the sequence of characters; and a processing device coupled to the interface, the processing device implementing a lexer and a parser, the parser to receive a sequence of tokens, each token converted by the lexer from the sequence of characters and comprising a lexeme and a token type, wherein each lexeme comprises one or more of the sequence of characters, wherein each token type describes at least one of a plurality of predetermined classes ascribed to lexemes by the lexer, and, wherein the conversion of characters into tokens includes ascribing multiple, different predetermined classes to a single token using one token type, wherein the lexeme for the single token may function as any one of the multiple, different predetermined classes ascribed to the single token; and analyze the sequence of tokens to detect data types within the sequence of characters based upon the token types of the sequence of tokens, including the token type ascribing the multiple predetermined classes to the single token.

16. A non-transitory machine-readable storage medium storing executable program instructions, which, when executed cause a data processing system to detect data in a sequence of characters by:

receiving, by a parser, a sequence of tokens, each token converted by a lexer from the sequence of characters and comprising a lexeme and a token type, wherein each lexeme comprises one or more of the sequence of characters, wherein each token type describes at least one of a plurality of predetermined classes ascribed to lexemes by the lexer, and, wherein the conversion of characters into tokens includes ascribing multiple, different predetermined classes to a single token using one token type, wherein the lexeme for the single token may function as any one of the multiple, different predetermined classes ascribed to the single token; and analyzing, by the parser, the sequence of tokens to detect data types within the sequence of characters based upon the token types of the sequence of tokens, including the token type ascribing the multiple predetermined classes to the single token.

* * * * *